US008968003B2

(12) United States Patent
Hendrickson et al.

(10) Patent No.: US 8,968,003 B2
(45) Date of Patent: *Mar. 3, 2015

(54) SURGICAL SIMULATOR, SIMULATED ORGANS AND METHODS OF MAKING SAME

(71) Applicant: Colorado State University Research Foundation, Fort Collins, CO (US)

(72) Inventors: Dean A. Hendrickson, Fort Collins, CO (US); Fausto Bellezzo, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/201,313

(22) Filed: Mar. 7, 2014

(65) Prior Publication Data

US 2014/0186809 A1 Jul. 3, 2014

Related U.S. Application Data

(63) Continuation of application No. 13/091,913, filed on Apr. 21, 2011, now Pat. No. 8,708,707.

(60) Provisional application No. 61/364,740, filed on Jul. 15, 2010, provisional application No. 61/364,906, filed on Jul. 16, 2010.

(51) Int. Cl.
*G09B 23/28* (2006.01)
*G09B 23/30* (2006.01)

(52) U.S. Cl.
CPC .............. *G09B 23/28* (2013.01); *G09B 23/303* (2013.01); *G09B 23/30* (2013.01)
USPC .......................................... 434/267

(58) Field of Classification Search
USPC .................................. 434/262, 267, 268, 272
See application file for complete search history.

(56) References Cited

U.S. PATENT DOCUMENTS

| | | | | |
|---|---|---|---|---|
| 5,425,644 A | * | 6/1995 | Szinicz | 434/268 |
| 5,620,326 A | * | 4/1997 | Younker | 434/268 |
| 5,803,746 A | * | 9/1998 | Barrie et al. | 434/267 |
| 5,951,301 A | * | 9/1999 | Younker | 434/272 |
| 6,488,507 B1 | * | 12/2002 | Stoloff et al. | 434/272 |
| 6,997,719 B2 | * | 2/2006 | Wellman et al. | 434/272 |
| 7,272,766 B2 | * | 9/2007 | Sakezles | 714/742 |
| 7,427,199 B2 | * | 9/2008 | Sakezles | 434/267 |
| 7,507,092 B2 | * | 3/2009 | Sakezles | 434/267 |
| 7,519,209 B2 | * | 4/2009 | Dawant et al. | 382/128 |
| 7,549,866 B2 | * | 6/2009 | Cohen et al. | 434/267 |
| 7,677,897 B2 | * | 3/2010 | Sakezles | 434/267 |
| 7,699,615 B2 | * | 4/2010 | Sakezles | 434/274 |
| 7,857,626 B2 | * | 12/2010 | Toly | 434/267 |
| 7,862,339 B2 | * | 1/2011 | Mulligan | 434/268 |
| 7,931,471 B2 | * | 4/2011 | Senagore et al. | 434/267 |
| 8,100,695 B2 | * | 1/2012 | Duprez et al. | 434/268 |
| 8,297,982 B2 | * | 10/2012 | Park et al. | 434/262 |
| 2007/0077544 A1 | * | 4/2007 | Lemperle et al. | 434/262 |
| 2011/0052028 A1 | * | 3/2011 | Shreiber | 382/131 |

* cited by examiner

*Primary Examiner* — Kurt Fernstrom
(74) *Attorney, Agent, or Firm* — Polsinelli PC

(57) ABSTRACT

A surgical simulator is disclosed herein. The surgical simulator includes an artificial organ and an enclosure substantially enclosing the artificial organ. The artificial organ is substantially formed of platinum cured room temperature vulcanization silicone rubber ("PCRTVS").

23 Claims, 15 Drawing Sheets

SURGICAL SIMULATOR, SIMULATED ORGANS AND METHODS OF MAKING SAME

CROSS REFERENCE TO RELATED APPLICATIONS

The present application is a continuation application of U.S. application Ser. No. 13/091,913 filed Apr. 21, 2011, which application claims the benefit under 35 U.S.C. §119(e) of: U.S. Provisional Application 61/364,740, filed Jul. 15, 2010 and titled Multilayer Artificial Abdominal Body Wall; and U.S. Provisional Application 61/364,906, filed Jul. 16, 2010 and titled Non-Medical Grade Silicone Vessels for Simulation Models. The contents of all the above-mentioned patent applications are hereby incorporated by reference in their entirety.

The present application is also related to U.S. patent application Ser. No. 13/091,873, which is entitled "Simulated Tissue, Body Lumens and Body Wall and Methods of Making Same", filed Apr. 21, 2011, now U.S. Pat. No. 8,613,621, dated Dec. 24, 2013, which is also incorporated by reference in its entirety into the present application.

FIELD OF THE INVENTION

The present invention relates to simulated anatomical models and methods of making such models. More specifically, the present invention relates simulated organs and related methods of manufacture.

BACKGROUND OF THE INVENTION

A surgical technique is learned by physically practicing the technique. For example, a student may practice making an incision and then suturing the incision on a living patient (e.g., a dog, pig, etc.), a cadaver, or a model (e.g., the backing of a carpet remnant). Each of these has it disadvantages.

For example, while practicing surgical techniques on living animals offers the advantage of actual surgical conditions, there are high associated costs due to having to obtain, take care of, and dispose of the animals. Also, societal attitudes are increasingly less favorable towards the use of animals for such purposes.

Surgical conditions with cadaver tissue are less realistic than with actual living tissue due to a lack of flowing body fluids and the physical characteristics of dead tissue. Also, there are high costs associated with obtaining, maintaining, and disposing of cadavers.

While practicing making an incision and suturing on a backing of a carpet remnant may be inexpensive and portable for the student, such a model has a poor correlation to actual tissue and can end up causing the student to develop incorrect techniques.

There is a need in the art for simulated anatomical models useable for practicing surgical techniques, wherein the simulated anatomical models overcome the above-discussed disadvantages.

BRIEF SUMMARY OF THE INVENTION

A surgical simulator is disclosed herein. The surgical simulator includes an artificial organ and an enclosure substantially enclosing the artificial organ. The artificial organ is substantially formed of platinum cured room temperature vulcanization silicone rubber ("PCRTVS").

In one embodiment of the surgical simulator, the artificial organ includes at least one of an artificial liver or artificial spleen. The at least one of an artificial liver or artificial spleen includes at least one lumen substantially formed of PCRTVS. When the at least one of an artificial liver or artificial spleen is an artificial liver, the at least one lumen generally imitates a vascular inflow and outflow tract segmented according to Couinaud's classification. Additionally or alternatively, when the at least one of an artificial liver or artificial spleen is an artificial liver, the at least one lumen generally imitates a biliary drainage tract segmented according to Couinaud's classification. The surgical simulator can also include a system that fluidly pressurizes the at least one lumen, such a system including at least one of a pumping mechanism or a fluid reservoir. The surgical simulator can also include an element that facilitates determining an amount of fluid lost via an opening created in the at least one lumen.

In one embodiment, the at least one of an artificial liver or artificial spleen is substantially formed of a mixture comprising a ground cured PCRTVS mixed with a liquid PCRTVS that is then allowed to cure. For example, the ground cured PCRTVS includes at least one of a ground cured PCRTVS durometer Shore A10, a ground cured PCRTVS durometer Shore OO3, or a ground cured PCRTVS durometer Shore OO10. Also as an example, the liquid PCRTVS includes a PCRTVS durometer Shore OO30.

In one embodiment of the surgical simulator, the artificial organ includes an artificial ovarian organ. The artificial ovarian organ can include at least one lumen substantially formed of PCRTVS. The surgical simulator can also include a system that fluidly pressurizes the at least one lumen, such a system including at least one of a pumping mechanism or a fluid reservoir. The surgical simulator can also include an element that facilitates determining an amount of fluid lost via an opening created in the at least one lumen.

In one embodiment, the artificial ovarian organ can include an ovary portion formed of one type of PCRTVS and a uterine horn portion formed of another type of PCRTVS. For example, the ovarian portion is substantially formed of PCRTVS durometer Shore A10, and the uterine horn portion is substantially formed of PCRTVS durometer Shore OO10.

In one embodiment of the surgical simulator, the artificial organ includes an artificial hollow viscera. The artificial hollow viscera can be substantially formed of PCRTVS. For example, the artificial hollow viscera can be substantially formed of PCRTVS in a multi-layer arrangement, at least some of layers of the multi-layer arrangement being different types of PCRTVS.

In one embodiment of the surgical simulator, the enclosure includes an exterior wall including surgical access openings defined therein. The surgical access openings can be configured for laparoscopic surgical instruments.

In one embodiment, the surgical simulator further includes an organ support assembly configured to removably support the organ within the enclosure.

In one embodiment of the surgical simulator, the enclosure includes an exterior wall including an artificial body wall substantially formed of different layers of PCRTVS. The artificial body wall can be vascularized with a plurality of lumens substantially formed of PCRTVS. The surgical simulator also includes a system that fluidly pressurizing the plurality of lumens, the system including at least one of a pumping mechanism or a fluid reservoir. The surgical simulator can also include an element that facilitates determining an amount of fluid lost via an opening created in the plurality of lumens.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Figure 1:
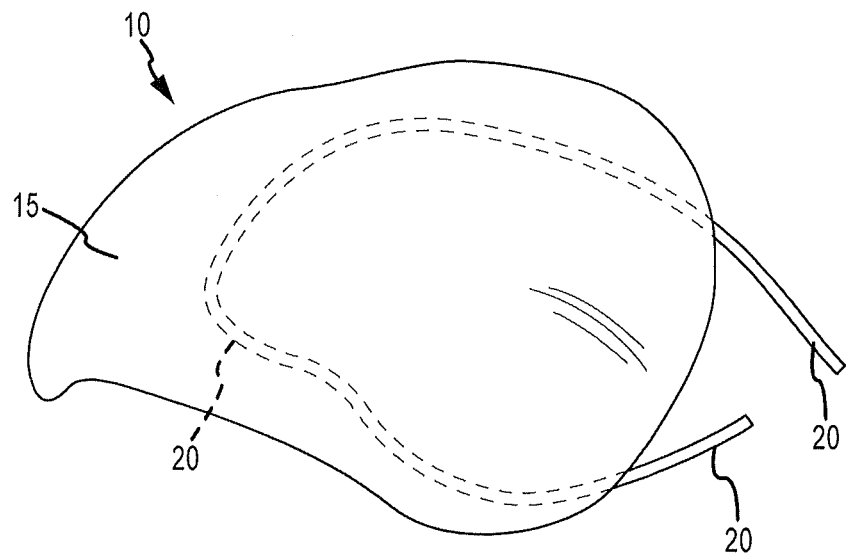
FIG. 1 is an anterior view of an artificial liver.

Laparoscopic simulators and artificial organs and artificial viscera for use in the laparoscopic simulators are disclosed herein. The laparoscopic simulators, artificial organs and artificial viscera are advantageous because they offer a truly realistic surgical experience akin to working on a living animal.

a. Artificial Organs

In one embodiment, artificial tissues may be used to form an artificial anatomical structure such as an artificial organ having a configuration that mimics a real organ with respect to appearance, types and order of tissue layers, thickness of tissue layers, tactile response, color, shape, and ability to hold a suture. The artificial organ may include a vascular system within appropriate portions of the artificial organ, thereby allowing the organ to hemorrhage when punctured or cut. Finally, the artificial organ may include selected anatomical details common to a specific organ being modeled. Such anatomical details can be used for providing landmarks that are important for a particular surgical procedure and for providing an artificial organ that is realistic in appearance.

i. Liver and Biliary Vesicle

In humans and other animals, the liver is a reddish brown lobulated organ. The liver is both the largest internal organ and the largest gland in the body. The liver has a wide range of functions, including detoxification, protein synthesis, and production of biochemicals necessary for digestion. The liver's highly specialized tissue regulates a wide variety of high-volume biochemical reactions, including the synthesis and breakdown of small and complex molecules, many of which are necessary for normal vital functions. For example, bile is a complex secretory product produced by the liver and concentrated and store in the gallbladder.

The liver is an organ that is subjected to several different types of insults and often requires some type of surgical intervention, including transplantation.

The French surgeon Couinaud described the recognition of the segmental nature of the liver. According to Couinaud's description, the liver is divided into eight functionally independent segments. In Couinaud's classification, each one of the segments has its own vascular inflow, outflow and biliary drainage. Because of this division into self-contained units, each segment can be resected without damaging remaining segments.

There are three hepatic veins of surgical importance. These hepatic veins are the right hepatic vein, the middle hepatic vein and the left hepatic vein. The right hepatic vein drains segments 6-8 by a short vessel directly into the supra-hepatic vena cava. The middle hepatic vein drains from both hepatic lobes and empties directly into the vena cava or the left hepatic vein. The left hepatic vein drains segments 2-4. Segment 1, or the caudate lobe, drains by several small hepatic veins directly into the infra-hepatic vena cava.

These anatomical relationships of the liver are of importance for accurate surgical planning Preserving as much as possible the liver's segmentation, especially in relationship to the afferent and efferent vasculatures of the liver, is something not yet represented in simulation models known in the art.

Disclosed below is an artificial liver that brings an increased level of realism in surgical education. Specifically, the artificial liver has a realistic appearance, is realistic in response to manipulation and surgical interventions, and, in some embodiments, replicates a liver's actual segmentation. Such an artificial liver can greatly enhance how surgical skills are taught with respect to surgical liver diseases, bringing the surgical trainee another step closer to mastering a surgical technique before ever touching a live patient.

For a detailed discussion of an embodiment of a first type of artificial organ 10 of an animal or human, reference is made to FIG. 1, which is an anterior view of an artificial liver 10. As shown in FIG. 1, the artificial liver 10 includes an artificial liver body 15 and one or more artificial liver lumens 20. The artificial liver body 15 is representative of a liver body of a human or animal. The artificial liver body 15 may be similar to a real liver body in both appearance and physical characteristics. For example, in one embodiment, the artificial liver body 15 may have a solid structure with a friable texture and a strong capsule.

The artificial liver body 15 may have accurate surface detail and realistic color and texture that closely mimic the surface of a real liver body. The shape of the artificial liver body 15 may include the anatomical features common to real livers, the anatomical features being correct with respect to shape, size and location. For example, the artificial liver body 15 may include hepatic lobes and/or other anatomical features of a real liver body. Also, associated anatomical structures, such as, for example, the gall bladder, may be formed to be part of a model mimicking the artificial liver and artificial gall bladder.

The one or more artificial liver lumens 20 may be of a number, size, location and network that generally mimics the lumens found in a real liver body. For example, the artificial liver body 15 may have artificial liver lumens 20 that are configured to replicate the segments of a real liver and the lumen arrangement of a real liver. Thus, such artificial lumens 20 may represent the right hepatic vein, the middle hepatic vein, the left hepatic vein and/or etc.

As discussed below, the artificial lumens 20 may be fluidly coupled to a fluid reservoir. Due to head provided via elevation of the fluid reservoir or a mechanical pumping arrangement, an artificial body fluid can be caused to ooze through the material forming the artificial liver body 15 when the material forming the artificial liver body 15 is cut during a simulated surgical procedure on the artificial liver 10. Similarly, the artificial body fluid can be caused to rapidly flow from an artificial liver lumen 20 when the artificial liver lumen 20 is cut during a simulated surgical procedure on the artificial liver 10. Thus, in one embodiment, the artificial liver 10 provides a surgical training experience that is very similar to a real surgical experience. For example, the artificial liver 10 offers dissection between sections and realistic surgical approaches with bleeding consequent to erroneous incisions, or purposely due to a necessary surgical technique.

Example surgical skills that can be practiced on such an artificial liver 10 include suturing, biopsy, foreign body removals (e.g., tumor removals), targeted removal of portions of the liver (e.g., cholecystectomy, lobectomy, etc.), dissecting techniques, transplantation, and etc. The size and configuration of an artificial liver 10 may be tailored to represent the liver of a human or specific animal. Also, the artificial liver 10 may be configured to have a normal, healthy contour or an abnormal or enlarged contour with growths, abnormalities, injuries, etc. that can be diagnosed and the subject of a surgical treatment technique. The materials used to form the artificial liver 10 lend themselves to ultrasound evaluations of characteristic masses. Different consistencies and textures for the material forming the artificial liver body 15 can be used so as to approximate a healthy, normal liver or a liver having a specific type of disease (e.g., cirrhosis of the liver, etc.).

Figure 2:
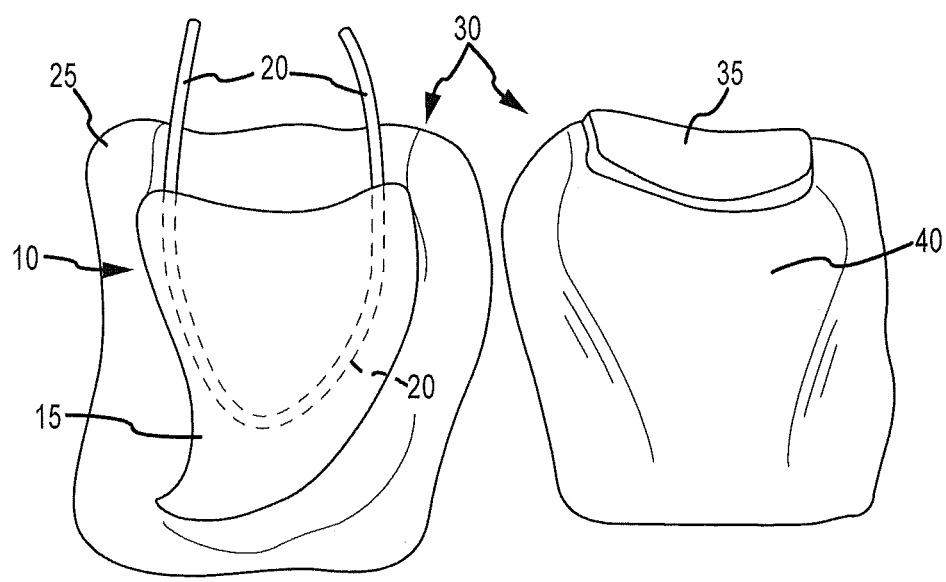
FIG. 2 is a posterior view of the artificial liver residing in a first portion of a mold, the second portion of the mold being located next the first portion.
Figure 3:
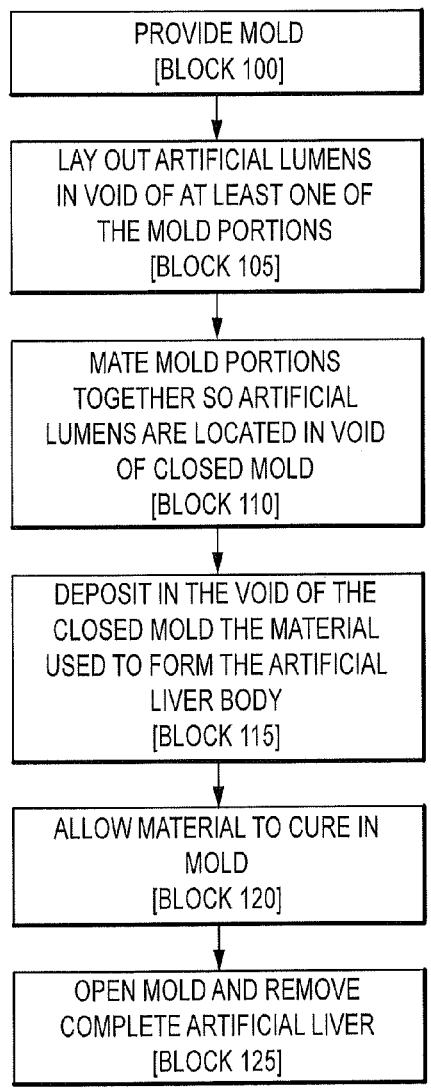
FIG. 3 is a flow chart outlining an embodiment of the manufacturing method for the artificial liver.

For a discussion regarding a method of manufacturing, and the material compositions forming, the artificial liver 10 and, more specifically, its artificial body 15 and artificial lumens 20, reference is made to FIGS. 2 and 3. FIG. 2 is a posterior view of the artificial liver 10 residing in a first portion 25 of a mold 30, the second portion 35 of the mold being located next the first portion 25. FIG. 3 is a flow chart outlining an embodiment of the manufacturing method. As can be understood from FIG. 2, in one embodiment, a mold 30 is provided [block 100]. In one embodiment, the mold is sculpted or machined to resemble a negative of a liver body the artificial liver 10 is to replicate. In another embodiment, the mold is a result of an initial mold taken of a liver body of a living or deceased creature or a sculpted liver body. For example, a short-lived mold is created from an original that may be deceased, alive, or sculpted. A clay positive is casted utilizing the short-lived mold, the clay positive representing the original liver body. The clay positive is corrected as needed, in accordance to the objective of the final product. As an example, it may be desirable to have a more anatomically correct mold if the objective is the training of surgical approaches or techniques that require recognition of specific landmarks.

A polyurethane mold is then formed about the clay positive. In doing so, borders are created around the clay positive with a moldable oil based soft clay. The mold is then pulverized with a release agent and allowed to dry. A first layer of polyurethane Shore A 30 is then poured or painted over the clay positive, followed by a minimum of three and a maximum of five layers of the same material, which are reinforced with polyester fibers. A period of 15-20 minutes is allowed to elapse between layers of polyurethane. Once all layers of polyurethane are laid up, the polyurethane mold is left to completely cure for a period of 24 hours prior to being used in the molding of the artificial liver 10. Some of the mold embodiments require a hard shell in order to prevent permanent deformation or simply to facilitate handling of the mold. In one embodiment, the outer shell is created using a fast set liquid plastic. In other embodiments, the outer shell is created using other materials, such as, for example, plaster and fiberglass. Some molds will be multi-part and, as a result, will have an outer shell so as to facilitate the creation of a tight seal between the edges of the mold.

For a two part or other multi-part molds, the particularities of each structure will require variations, but the principle remains very similar. The first part of a two part mold includes casting of a lumen of a hollow viscera or large vessel. The second part of the two part mold can be created after the thickness of the wall of the structure to be cast is determined, and an equal thickness lining of soft clay is utilized to cover the entire cast structure, preparing for the making of the second part of the mold. When placed together these two parts create a lumen and a wall that preserves anatomical details and thickness.

As can be understood from FIG. 2, the mold has a first portion 25 and a second portion 35, each of said portions having a void 40 defined therein that corresponds to a negative of a surface of one side of a real liver. The mold portions 25, 35 mate together such that the voids 40 in each portion 25, 35 form a complete void 40 that has a shape and volume corresponding to the real liver body to be modeled.

As can be understood from FIG. 3, once the mold 30 is provided, the manufacture of the artificial liver 15 can begin. For example, as can be understood from FIG. 2, the artificial lumens 20, which are manufactured as described below prior to the manufacture of the liver body 15, are laid out in the void of at least one of the mold portions 25, 35 [block 105]. Depending on the embodiment, the artificial lumens 20 may be located within the voids 40 of the mold 30 in a generally random manner or in a manner that replicates the lumens of a real liver.

The mold portions 25, 35 are then brought together such that the artificial lumens 20 are located in the void 40 of the closed mold 30 [block 110]. The material used to form the artificial liver body 15 is then poured, sprayed, injected or otherwise deposited into the void 40 of the mold 30 [block 115].

In one embodiment, the artificial liver body 15 is formed of a combination of platinum cured room temperature vulcanization silicone rubber ("PCRTVS"). Specifically, the combination forming the artificial liver body 15 includes variable percentages of fine ground mixtures including cured PCRTVS durometer Shore A10, PCRTVS durometer Shore OO30, and PCRTVS durometer Shore OO10, all of said fine ground cured PCRTVS being mixed into liquid PCRTVS durometer Shore OO30. Thus, the material deposited into the mold void 40 to manufacture the artificial liver body 15 is a slurry or mix including ground granular cured PCRTVS mixed into a liquid PCRTVS. Other materials that may be mixed into the PCRTVS for color, texture and/or reinforcement include rayon fiber and colors.

In one embodiment, the PCRTVS durometer Shore A10 is Dragon Skin A10 ®, the PCRTVS durometer Shore OO10 is Ecoflex OO10 ®, and the PCRTVS durometer Shore OO30 is Ecoflex OO30 ®, all of which are manufactured by Smooth-on of Easton, Pa. In one embodiment, the combination of fine ground cured PCRTVS A10, OO10 and OO30 and liquid PCRTVS OO30 forms generally the entirety of the composition of the artificial liver body 15.

In one embodiment, the combined fine ground PCRTVS is formed of approximately 33% PCRTVS A10, approximately 33% PCRTVS OO10, and approximately 34% PCRTVS OO30, by weight. The material forming the artificial liver body 15 is formed of approximately 33% the combined fine ground PCRTVS and approximately 67% liquid PCRTVS OO30, by weight.

In other embodiments, the combined fine ground PCRTVS is formed of between approximately 10% and approximately 30% PCRTVS A10, between approximately 20% and approximately 40% PCRTVS OO10, and between approximately 70% and approximately 30% PCRTVS OO30, by weight. In one embodiment, the material forming the artificial liver body 15 is formed of between approximately 30% and approximately 50% the combined fine ground PCRTVS and between approximately 50% and approximately 70% liquid PCRTVS OO30, by weight.

As can be understood by those skilled in the art, the Shore durometer numbers provided above represent the Shore durometer of the respective cured material. The two Shore durometer scales are "A" and "OO", with the "A" scale going from A10 to A40 for either polyurethane or silicone rubber. A10 is at the softest end of the "A" scale. The "OO" scale is softer than the "A" scale, and OO10 is at the softest end of the "OO" scale.

As can be understood from FIGS. 2 and 3, once the material used to form the artificial liver body 15 has cured with the artificial liver lumens 20 molded into the artificial liver body 15 [block 120, the mold 30 is opened by separating its two portions 25, 30 from each other [block 125]. In some embodiments, the resulting artificial liver body 15 has a granular interior with a strong outer capsule.

Seeping after incising an artificial organ can also be mimicked. In one embodiment, seeping is made possible by the creation of multiple small (e.g., approximately 1 mm in diameter) channels in the artificial liver body during the pouring/curing process used in forming the artificial liver body. Specifically, to create the multiple small channels in the artificial liver body during its formation, an agglomerate of smooth monofilament nylon strings are located in the mold used to form the artificial liver body. The material used to form the artificial liver body is then deposited into the mold, thereby resulting in the agglomerate of smooth monofilament nylon strings being imbedded in the material used to form the artificial liver body. Once the material used to form the artificial live body has cured, the monofilament nylon strings can be pulled out of the cured material, thereby creating the small channels. An end of the resulting channels formed via the monofilament nylon strings can be connected to a fluid source. Once cut, the small channels would allow passage of fluid, creating the seeping effect. During a simulated surgical procedure, seep effect would only be responsive to locally applied pressure or regional ligation.

To facilitate such seeping, the artificial lumens 120 may have small perforations or openings in the walls of the artificial lumens 120 along the portions of the artificial lumens hidden within the material forming the artificial liver body. The flow of the artificial body fluid may flow rapidly in the event an artificial liver lumen is nicked or severed.

In one embodiment, the artificial liver 10 can be manufactured to have attachment points that facilitate the artificial liver 10 being mounted within an artificial torso or laparoscopic frame, as discussed below.

ii. Spleen

The spleen is an organ found in virtually all vertebrate animals with important roles in regard to red blood cells and the immune system. In humans, the spleen is located in the left upper quadrant of the abdomen. The spleen removes old red blood cells and holds a reserve of blood in case of hemorrhagic shock while also recycling iron. The spleen synthesizes antibodies in its white pulp and removes antibody-coated bacteria along with antibody-coated blood cells by way of blood and lymph node circulation. The spleen is one of the centers of activity of the reticuloendothelial system and can be considered analogous to a large lymph node, as its absence leads to a predisposition toward certain infections.

The size of the human spleen is about 12 cm×7 cm×3 to 4 cm in thickness, and the average weight is about 150 g, (80 to 300 g). The spleen is purple and gray. Surgical interventions of the spleen include capsule repair and splenic resection. A ruptured spleen occurs when the organ or its blood supply has been disrupted by penetrating trauma, non-penetrating trauma, operative trauma, or by a spontaneous event.

The spleen is the most common intra-abdominal organ injured in blunt trauma (often associated with automobile accidents or body-contact sports) and is frequently injured by penetrating trauma (gunshot, knife wound). Splenic ruptures can occur acutely (such as after an automobile accident) or may be delayed (as from a very slow bleed). Surgeons classify splenic ruptures by the amount of injury to the organ, with class I having the least amount of damage and class V the most.

The spleen is vulnerable to injury during operative procedures in the upper abdomen. Operations on the stomach, hiatus, vagus nerve, pancreas, left kidney and adrenal gland, and transverse and descending colon carry the risk of splenic injury.

Injuries to the body of the spleen that do not disrupt major vessels cause an initial blood loss of about 500 ml that ceases spontaneously without signs of abdominal distention or shock. These types of injuries, however, have the potential to cause rupture at a time remote from the injury and account for the phenomenon of delayed rupture of the spleen.

In recent years, treatment of spleen injuries has evolved toward splenic repair and preservation because of the spleen's important role in immunity and a better understanding of complications that can arise from splenectomy later in life. Partial splenectomy or splenic repairs are being done with greater frequency.

The need for a training model that allows surgeons to maintain excellent surgical skills as well as enabling trainees to simulate with as much accuracy as possible the difficult circumstances that can be present during a real splenic rupture could be extremely useful. Whether a capsule repair or a splenectomy needs to take place, accuracy and speediness are of essence during an already stressful situation. Another useful purpose would be the training of the instrument negotiations required to avoid iatrogenic splenic trauma, a potential during other surgical interventions of the gastrointestinal tract.

Disclosed below is an artificial spleen that brings an increased level of realism in surgical education. Specifically, the artificial spleen has a realistic appearance and is realistic in response to manipulation and surgical interventions. Such an artificial spleen can greatly enhance how surgical skills are taught with respect to surgical spleen diseases, bringing the surgical trainee another step closer to mastering a surgical technique before ever touching a live patient.

Figure 4:
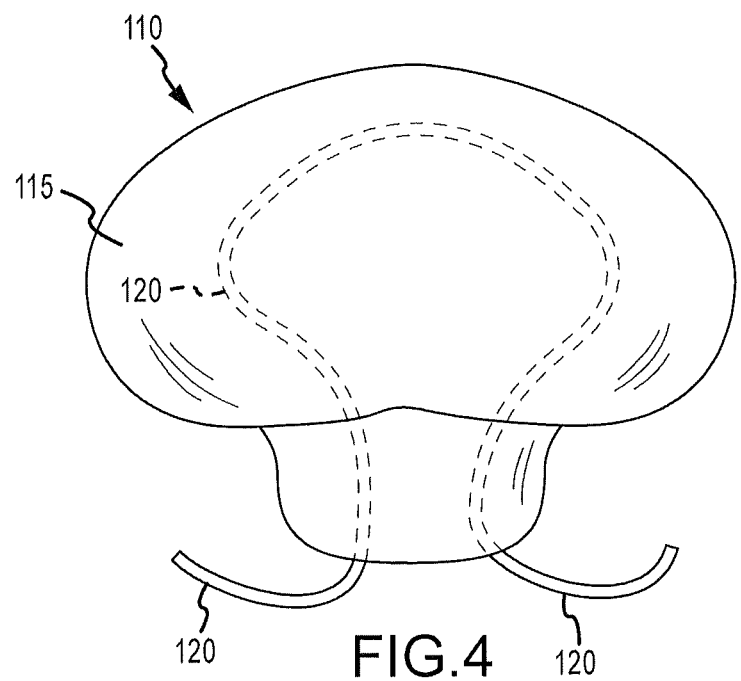
FIG. 4 is an anterior view of an artificial spleen.

For a detailed discussion of an embodiment of a second type of artificial organ 110 of an animal or human, reference is made to FIG. 4, which is an anterior view of an artificial spleen 110. As shown in FIG. 4, the artificial spleen 110 includes an artificial spleen body 115 and one or more artificial spleen lumens 120. The artificial spleen body 115 is representative of a spleen body of a human or animal. The artificial spleen body 115 may be similar to a real spleen body in both appearance and physical characteristics. For example, in one embodiment, the artificial spleen body 115 may have a solid structure with a friable texture and a strong capsule.

The artificial spleen body 115 may have accurate surface detail and realistic color and texture that closely mimic the surface of a real spleen body. The shape of the artificial spleen body 115 may include the anatomical features common to real spleens, the anatomical features being correct with respect to shape, size and location.

The one or more artificial spleen lumens 120 may be of a number, size, location and network that generally mimics the lumens found in a real spleen body.

As discussed below, the artificial lumens 120 may be fluidly coupled to a fluid reservoir. Due to head provided via elevation of the fluid reservoir or a mechanical pumping arrangement, an artificial body fluid can be caused to ooze through the material forming the artificial spleen body 115 when the material forming the artificial spleen body 115 is cut during a simulated surgical procedure on the artificial spleen 110. Similarly, the artificial body fluid can be caused to rapidly flow from an artificial spleen lumen 120 when the artificial spleen lumen 120 is cut during a simulated surgical procedure on the artificial spleen 110. Thus, in one embodiment, the artificial spleen 110 provides a surgical training experience that is very similar to a real surgical experience. For example, the artificial spleen 110 offers dissection and realistic surgical approaches with bleeding consequent to erroneous incisions, or purposely due to a necessary surgical technique.

Example surgical skills that can be practiced on such an artificial spleen 110 include suturing, biopsy, foreign body removals (e.g., tumor removals), targeted removal of portions of the spleen, dissecting techniques, partial or complete splenectomies, capsule repair, and etc. The size and configuration of an artificial spleen 110 may be tailored to represent the spleen of a human or specific animal. Also, the artificial spleen 110 may be configured to have a normal, healthy contour or an abnormal or enlarged contour with growths, abnormalities, injuries, etc. that can be diagnosed and the subject of a surgical treatment technique. The materials used to form the artificial spleen 110 lend themselves to ultrasound evaluations of characteristic masses. Different consistencies and textures for the material forming the artificial spleen body 115 can be used so as to approximate a healthy, normal spleen or a spleen having a specific type of disease.

Figure 5:
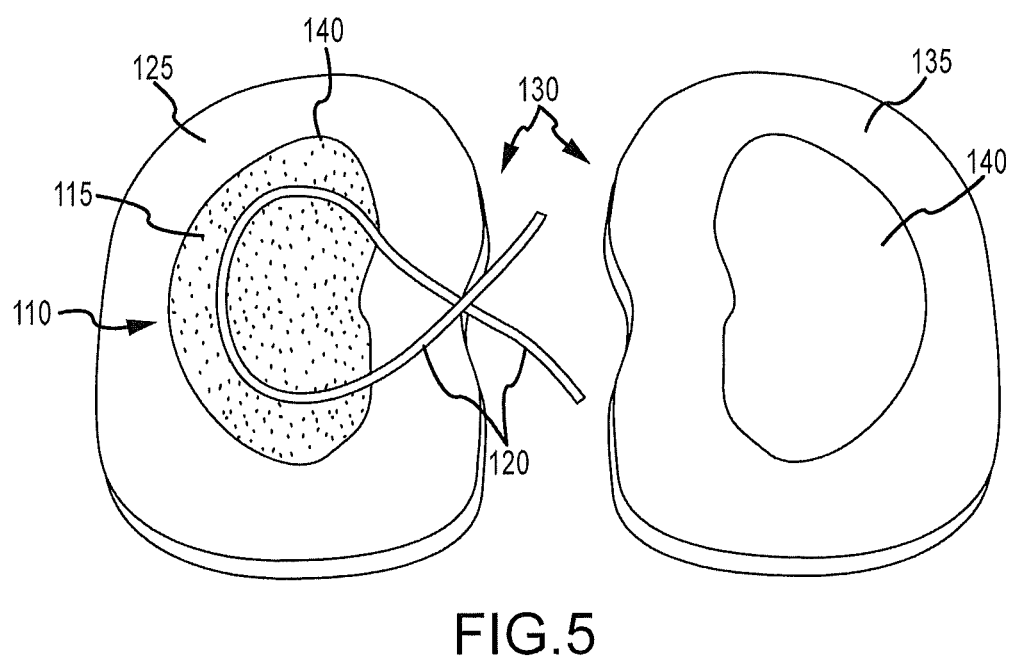
FIG. 5 is a view of materials used in forming the artificial spleen being deposited in a first portion of a mold, the second portion of the mold being located next the first portion.
Figure 6:
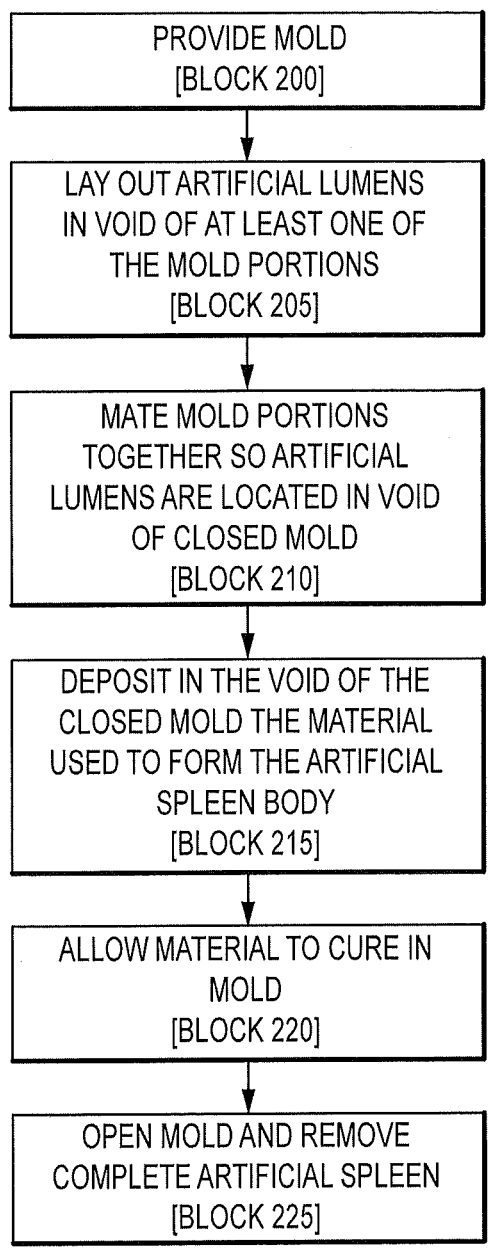
FIG. 6 is a flow chart outlining an embodiment of the manufacturing method for the artificial spleen.

For a discussion regarding a method of manufacturing, and the material compositions forming, the artificial spleen 110 and, more specifically, its artificial body 115 and artificial lumens 120, reference is made to FIGS. 5 and 6. FIG. 5 is a view of materials used in forming the artificial spleen 110 being deposited in a first portion 125 of a mold 130, the second portion 135 of the mold being located next the first portion 125. FIG. 6 is a flow chart outlining an embodiment of the manufacturing method. As can be understood from FIG. 5, in one embodiment, a mold 130 is provided [block 200]. The mold 130 is created in a manner as described above with respect to the artificial liver 10, except the mold 130 for the artificial spleen 110 is molded, sculpted, machined or otherwise created to resemble a negative of a spleen body the artificial spleen 110 is to replicate.

As can be understood from FIG. 5, the mold 130 has a first portion 125 and a second portion 135, each of said portions having a void 140 defined therein that corresponds to a negative of a surface of one side of a real spleen. The mold portions 125, 135 mate together such that the voids 140 in each portion 125, 135 form a complete void 140 that has a shape and volume corresponding to the real spleen body to be modeled.

As can be understood from FIG. 6, once the mold 130 is provided, the manufacture of the artificial spleen 110 can begin. For example, as can be understood from FIG. 5, the artificial lumens 120, which are manufactured as described below prior to the manufacture of the spleen body 115, are laid out in the void 140 of at least one of the mold portions 125, 135 [block 205]. Depending on the embodiment, the artificial lumens 120 may be located within the voids 140 of the mold 130 in a generally random manner or in a manner that replicates the lumens of a real spleen.

The mold portions 125, 135 are then brought together such that the artificial lumens 120 are located in the void 140 of the closed mold 130 [block 210]. The material used to form the artificial spleen body 115 is then poured, sprayed, injected or otherwise deposited into the void 140 of the mold 130 [block 215].

In one embodiment, the artificial spleen body 115 is formed of a combination of PCRTVS. Specifically, the combination forming the artificial spleen body 115 includes variable percentages of fine ground mixtures including cured PCRTVS durometer Shore A10, PCRTVS durometer Shore OO3, and PCRTVS durometer Shore OO10, all of said fine ground cured PCRTVS being mixed into liquid PCRTVS durometer Shore OO30. Thus, the material deposited into the mold void 140 to manufacture the artificial spleen body 115 is a slurry or mix including ground granular cured PCRTVS mixed into a liquid PCRTVS. Other materials that may be mixed into the PCRTVS for color, texture and/or reinforcement include rayon fiber and colors.

In one embodiment, the PCRTVS durometer Shore A10 is Dragon Skin A10 ®, the PCRTVS durometer Shore OO10 is Ecoflex OO10 ®, and the PCRTVS durometer Shore OO30 is Ecoflex OO10 ®, all of which are manufactured by Smooth-on of Easton, Pa. In one embodiment, the combination of fine ground cured PCRTVS A10, OO10 and OO30 and liquid PCRTVS OO30 forms generally the entirety of the composition of the artificial spleen body 115.

In one embodiment, the combined fine ground PCRTVS is formed of approximately 33% PCRTVS A10, approximately 33% PCRTVS OO10, and approximately 34% PCRTVS OO30, by weight. The material forming the artificial spleen body 15 is formed of approximately 30% the combined fine ground PCRTVS and approximately 70% liquid PCRTVS OO30, by weight.

In other embodiments, the combined fine ground PCRTVS is formed of between approximately 10% and approximately 30% PCRTVS A10, between approximately 20% and approximately 40% PCRTVS OO10, and between approximately 70% and approximately 30% PCRTVS OO30, by weight. In one embodiment, the material forming the artificial spleen body 15 is formed of between approximately 30% and approximately 50% the combined fine ground PCRTVS and between approximately 50% and approximately 70% liquid PCRTVS OO30, by weight.

As can be understood by those skilled in the art, the Shore durometer numbers provided above represent the Shore durometer of the respective cured material.

As can be understood from FIGS. 5 and 6, once the material used to form the artificial spleen body 115 has cured with the artificial spleen lumens 120 molded into the artificial spleen body 115 [block 220], the mold 130 is opened by separating its two portions 125, 130 from each other [block 225].

Figure 7:
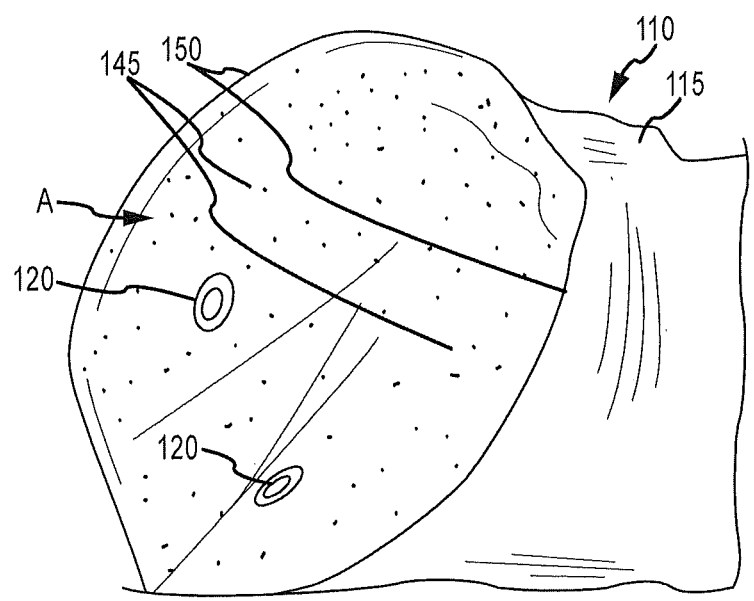
FIG. 7 is an isometric view of the artificial spleen body with a section resected away in the vicinity of arrow A.

As can be understood from FIG. 7, which is an isometric view of the artificial spleen body 115 with a section resected away in the vicinity of arrow A, in some embodiments, the resulting artificial spleen body 115 has a granular interior 145 with a strong outer capsule 150.

Seeping after incising an artificial organ can also be mimicked. In one embodiment, seeping is made possible by the creation of multiple small (e.g., approximately 1 mm in diameter) channels in the artificial spleen body during the pouring/curing process used in forming the artificial spleen body. Specifically, to create the multiple small channels in the artificial spleen body during its formation, an agglomerate of smooth monofilament nylon strings are located in the mold used to form the artificial spleen body. The material used to form the artificial spleen body is then deposited into the mold, thereby resulting in the agglomerate of smooth monofilament nylon strings being imbedded in the material used to form the artificial spleen body. Once the material used to form the artificial spleen body has cured, the monofilament nylon strings can be pulled out of the cured material, thereby creating the small channels. An end of the resulting channels formed via the monofilament nylon strings can be connected to a fluid source. Once cut, the small channels would allow passage of fluid, creating the seeping effect. During a simulated surgical procedure, seep effect would only be responsive to locally applied pressure or regional ligation.

To facilitate such seeping, the artificial lumens 120 may have small perforations or openings in the walls of the artificial lumens 120 along the portions of the artificial lumens hidden within the material forming the artificial spleen body 115. The flow of the artificial body fluid may flow rapidly in the event an artificial spleen lumen 120 is nicked or severed, as shown in FIG. 7.

In one embodiment, the artificial spleen 110 can be manufactured to have attachment points that facilitate the artificial spleen 110 being mounted within an artificial torso or laparoscopic frame, as discussed below.

iii. Uterus and Ovary

In humans and animals, the ovary and uterine horn form key portions of the female reproductive system. For the sake of this discussion when referring to both the ovary and uterine horn together, the ovary and uterine horn will be collectively referred to herein as an "ovarian organ".

Common indications for surgery of the ovary include ovarian masses, which are commonly unilateral, hematomas, abscess and cysts. With respect to an equine ovary, other less common indications are bilateral ovariectomy to prevent estrus in riding mares of no breeding potential and bilateral ovariectomy to create a "jump mare".

Disclosed below is an artificial ovarian organ 210 that brings an increased level of realism in surgical education. Specifically, the artificial ovarian organ 210 has a realistic appearance and is realistic in response to manipulation and surgical interventions. Such an artificial ovarian organ 210 can greatly enhance how surgical skills are taught with respect to surgical ovarian organ diseases, bringing the surgical trainee another step closer to mastering a surgical technique before ever touching a live patient.

Figure 8:
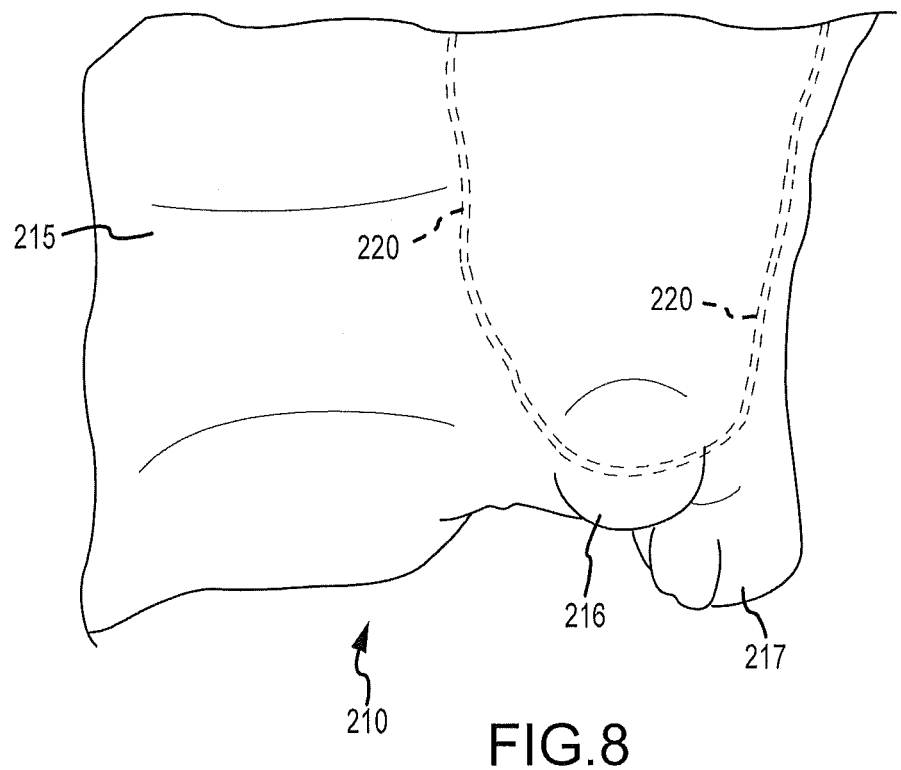
FIG. 8 is a side view of an artificial ovarian organ.

For a detailed discussion of an embodiment of a third type of artificial organ 210 of an animal or human, reference is made to FIG. 8, which is a side view of an artificial ovarian organ 220. As shown in FIG. 8, the artificial ovarian organ 220 includes an artificial ovarian organ body 215 and one or more artificial ovarian organ lumens 220. The artificial ovarian organ body 215 is representative of an ovarian organ body of a human or animal. For example, the artificial ovarian organ body 215 includes an artificial ovary 216 and an artificial uterine horn 217.

The artificial ovarian organ 210 has two different textures. A harder consistency for the artificial ovary 216 and a more flexible consistency for the artificial uterine horn 217. The artificial ovary and uterine horn are created with two different types of PCRTVS. The two types of respective textures of the artificial ovary and the artificial uterine horn are similar to those types of textures found in the same structures in a live animal or human.

The artificial ovarian organ body 215 may be similar to a real ovarian organ body in both appearance and physical characteristics. The artificial ovarian organ body 215 may have accurate surface detail and realistic color and texture that closely mimics the surface of a real ovarian organ body. The shape of the artificial ovarian organ body 215 may include the anatomical features common to real ovarian organ bodies, the anatomical features being correct with respect to shape, size and location.

The one or more artificial ovarian organ lumens 220 may be of a number, size, location and network that generally mimic the lumens found in a real ovarian organ body. For example, in one embodiment as indicated in FIG. 8, the uterine horn 217 has an artificial lumen (i.e., blood vessel) 220 that is positioned within the body of the uterine horn 217. The artificial lumen 220 forms a loop that passes through the proper ligament of the ovary 216, the mesosalphinx, inside the ovary 216 and up following the ovarian pedicle.

As discussed below, the artificial lumen 220 may be fluidly coupled to a fluid reservoir. Due to head provided via elevation of the fluid reservoir or a mechanical pumping arrangement, an artificial body fluid can be caused to flow (i.e., bleed) from the artificial lumen 220 when the artificial lumen 220 is severed during a simulated surgical procedure on the artificial ovarian organ 210. In other words, the artificial lumen 220 is connected with a source of artificial blood and can support moderate intra-luminal liquid pressure, similar to the diastolic blood pressure encountered in many different species. The purpose of the artificial lumen 220 is to bleed once it is cut, giving a trainee the opportunity to learn and or practice basic surgical methods, such as, for example, those methods of surgical laparoscopic hemostasis.

Thus, in one embodiment, the artificial ovarian organ 210 provides a surgical training experience that is very similar to a real surgical experience. For example, the artificial ovarian organ 210 offers dissection and realistic surgical approaches with bleeding consequent to erroneous incisions, or purposely due to a necessary surgical technique.

Example surgical skills that can be practiced on such an artificial ovarian organ 210 include suturing, biopsy, foreign body removals (e.g., tumor removals), ovariectomies, other surgeries of the genitourinary tract, dissecting techniques, and etc. The size and configuration of an artificial ovarian organ 210 may be tailored to represent the ovarian organ of a human or specific animal. Also, the artificial ovarian organ 210 may be configured to have a normal, healthy contour or an abnormal or enlarged contour with growths, abnormalities, injuries, etc. that can be diagnosed and the subject of a surgical treatment technique. The materials used to form the artificial ovarian organ 210 lend themselves to ultrasound evaluations of characteristic masses. Different consistencies and textures for the material forming the artificial ovarian organ body 215 can be used so as to approximate a healthy, normal ovarian organ or an ovarian organ having a specific type of disease.

Figure 9:
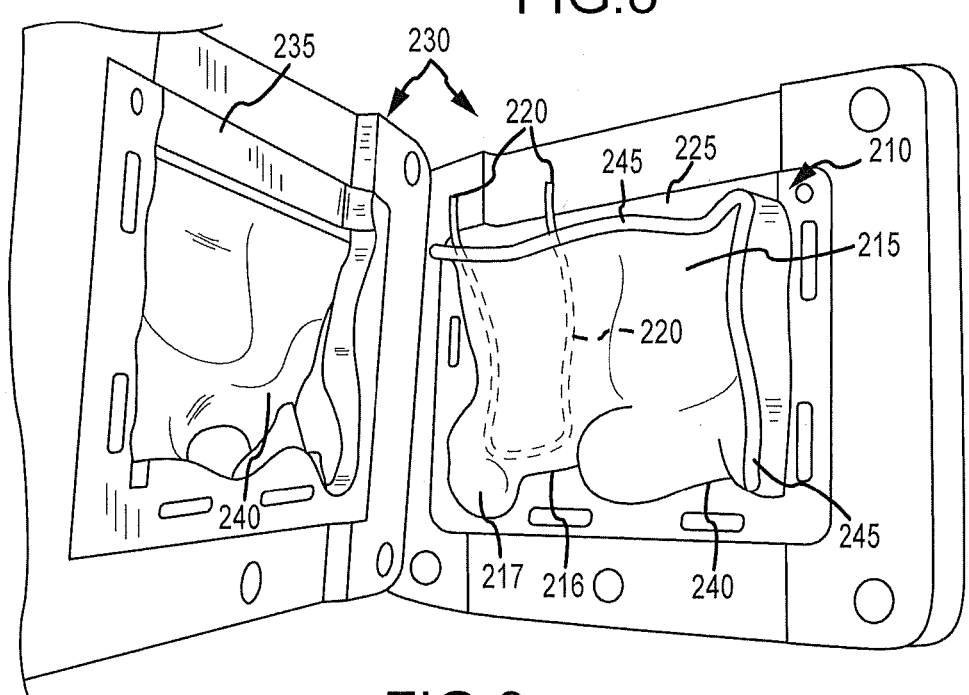
FIG. 9 is a view of the artificial ovarian organ located in a first portion of a mold, the second portion of the mold being located next the first portion, the ovarian organ being viewed from a side opposite that depicted in FIG. 8.
Figure 10:
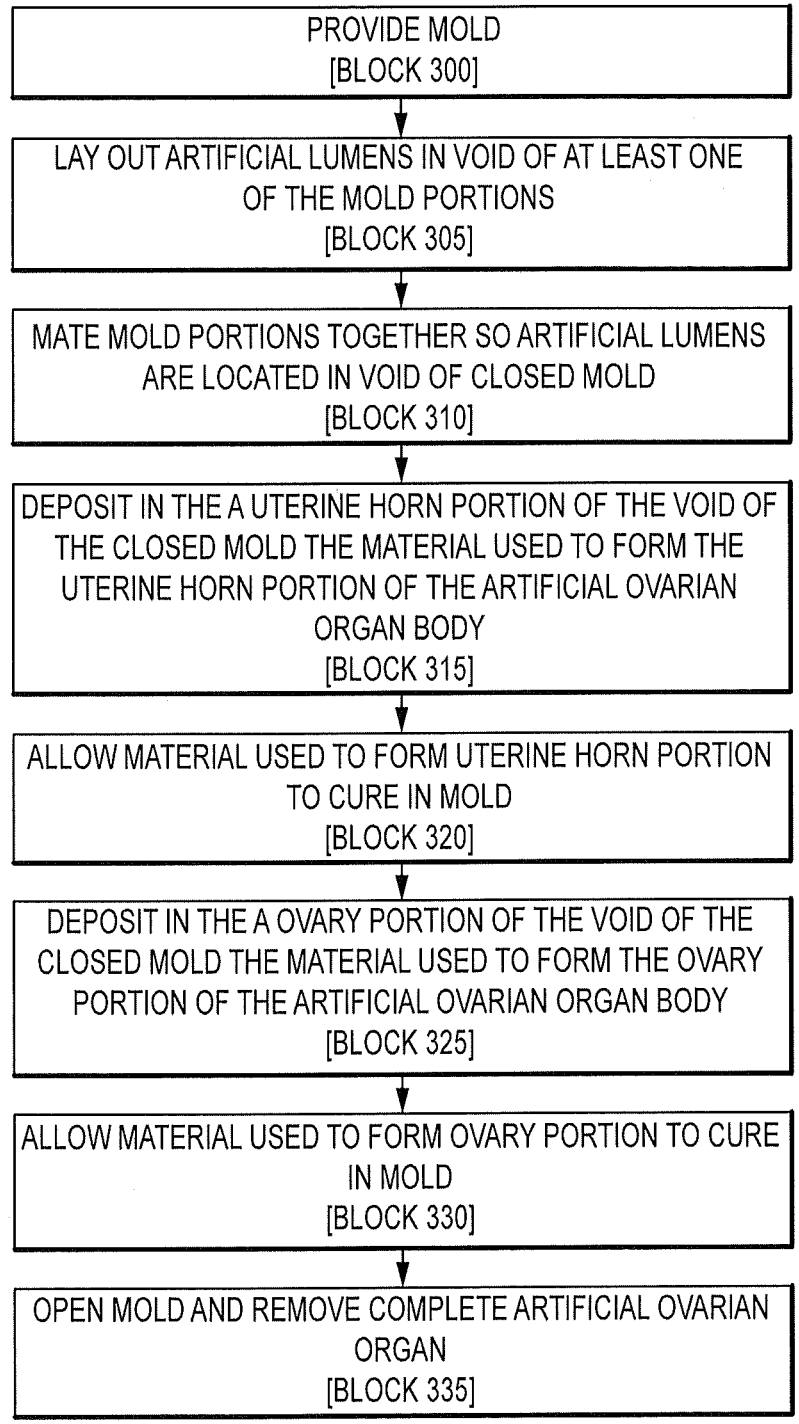
FIG. 10 is a flow chart outlining an embodiment of the manufacturing method artificial ovarian organ.

For a discussion regarding a method of manufacturing, and the material compositions forming, the artificial ovarian organ 210 and, more specifically, its artificial body 215 and artificial lumens 220, reference is made to FIGS. 9 and 10. FIG. 9 is a view of the artificial ovarian organ 210 located in a first portion 225 of a mold 230, the second portion 235 of the mold being located next the first portion 225, the ovarian organ being viewed from a side opposite that depicted in FIG. 8. FIG. 10 is a flow chart outlining an embodiment of the manufacturing method.

As can be understood from FIG. 9, in one embodiment, a mold 230 is provided [block 300]. The mold 230 is created in a manner as described above with respect to the artificial liver 10, except the mold 230 for the artificial ovarian organ 210 is molded, sculpted, machined or otherwise created to resemble a negative of an ovarian organ body the artificial ovarian organ 210 is to replicate.

As can be understood from FIG. 9, the mold 230 has a first portion 225 and a second portion 235, each of said portions having a void 240 defined therein that corresponds to a negative of a surface of one side of a real ovarian organ. The mold portions 225, 235 mate together such that the voids 240 in each portion 225, 235 form a complete void 240 that has a shape and volume corresponding to the real ovarian organ body to be modeled.

As can be understood from FIG. 10, once the mold 230 is provided, the manufacture of the artificial ovarian organ 210 can begin. For example, as can be understood from FIG. 9, the artificial lumens 220, which are manufactured as described below prior to the manufacture of the ovarian organ body 215, are laid out in the void 240 of at least one of the mold portions 225, 235 [block 305]. Depending on the embodiment, the artificial lumens 220 may be located within the voids 240 of the mold 230 in a generally random manner or in a manner that replicates the lumens of a real ovarian organ.

The mold portions 225, 235 are then brought together such that the artificial lumens 220 are located in the void 240 of the closed mold 230 [block 310]. The material used to form the artificial uterine horn 217 is then poured, sprayed, injected or otherwise deposited into the void 240 of the mold 230 [block 315]. Once the material used to form the artificial uterine horn 217 is cured [block 320], the material used to form the artificial ovary 216 is then poured, sprayed, injected or otherwise deposited into the void 240 of the mold 230 [block 325]. The material used to form the artificial ovary 216 is then allowed to cure [block 330]. Depending on the embodiment, the order of the pours in [blocks 315 and 325] may be reversed.

In one embodiment, the artificial ovarian organ body 215 has an ovary portion 216 formed one type of PCRTVS and a uterine horn portion 217 formed of another type of PCRTVS. Specifically, the ovarian portion 216 of the artificial ovarian organ body 215 is substantially formed of PCRTVS durometer Shore A10, and the uterine horn portion 217 of the artificial ovarian organ body 215 is substantially formed of PCRTVS durometer Shore OO10. Thus, in one embodiment, the ovarian portion 216 of the artificial ovarian organ body 215 has a cured durometer of approximately Shore A10, and the uterine horn portion 217 of the artificial ovarian organ body 215 a cured durometer of approximately Shore OO10. Other materials that may be mixed into the PCRTVS for color, texture and/or reinforcement include rayon and colors.

In one embodiment, the PCRTVS durometer Shore A10 is Dragon Skin A10 ®, and the PCRTVS durometer Shore OO10 is Ecoflex OO10 ®, all of which are manufactured by Smooth-on of Easton, Pa. As can be understood by those skilled in the art, the Shore durometer numbers provided above represent the Shore durometer of the respective cured material.

As can be understood from FIGS. 9 and 10, once the material used to form the artificial ovarian organ body 215 has cured with the artificial ovarian organ lumens 220 molded into the artificial ovarian organ body 215 [block 330], the mold 230 is opened by separating its two portions 225, 230 from each other [block 335].

As can be understood from FIG. 8, the flow of the artificial body fluid may flow rapidly in the event an artificial ovarian organ lumen 220 is nicked or severed in the course of performing a simulated surgical procedure on the artificial ovarian organ 210.

As depicted in FIG. 9, in one embodiment, the artificial ovarian organ 210 can be manufactured to have attachment points (e.g., flanges, lips, rims, etc.) 245 that facilitate the artificial ovarian organ 210 being mounted within an artificial torso or laparoscopic frame, as discussed below.

While the preceding disclosure of artificial organs is given in the context of an artificial liver 10, an artificial spleen 110 and an artificial ovarian organ 210, the disclosure should not be limited to artificial livers, spleen or ovarian organs, but should encompass other artificial organs. For example, the teachings herein can be readily applied to other artificial organs formed of PCRVTS and having lumens as provided below. Specifically, artificial organs such as an artificial heart, artificial kidney, artificial brain, artificial lung, etc. can be made from various combinations PCRVTS as disclosed herein. Accordingly, the scope of any inventions disclosed herein should only be limited with respect to types of organs as provided in the accompanying claims.

b. Artificial Vessels and Artificial Hollow Viscera

In other embodiments, artificial tissues may be used to form an artificial anatomical structure such as an artificial vessel or artificial hollow viscera. An artificial vessel or hollow viscera has a lumen wall with a multi-layer configuration that mimics a real lumen wall of a body with respect to types and order of layers, thickness of layers, tactile response, color, and ability to hold a suture.

Real vessels, such as, for example, an artery or vein, have four layers at the microscopic level. Specifically, the layers are a protective fibrous covering, a middle layer of smooth muscle and elastic fibers, and an inner layer of connective tissue lined with a smooth layer of cells. Arteries have a thicker muscle layer to withstand the higher systolic pressures. Veins are wider and adapt to the change in volume of blood.

Real hollow viscera may be in the form of an alimentary system, which is the segment extending from the mouth, passing through the esophagus, stomach, duodenum, jejunum, ileum, cecum and appendix (humans), ascending colon, transverse colon, descending colon, rectum and anus.

These hollow viscera all have particular anatomic and histologic features that are a reflection of their functional physiology. What all hollow viscera have in common is some kind of tissue layering that reflects its function.

For the artificial lumens 20, 120, 220 (e.g., vessels for blood, bile or other body fluids) disclosed above with respect to the organs of FIGS. 1, 4 and 8, the wall thickness and internal diameter will vary according to the type of lumen being mimicked and the location where the artificial lumens 20, 120, 220 are to be placed in a larger model. For example, the configuration of an artificial lumen 20, 120, 220 will vary depending on if the artificial lumen is supposed to be serving as a blood, bile or other body fluid vessel in the artificial organs 10, 110, 210 discussed above or in other body structures, such as, for example, an artificial body wall model as disclosed in U.S. patent application Ser. No. 13/091,873, which is entitled "Simulated Tissue, Body Lumens and Body Wall and Methods of Making Same", filed Apr. 21, 2011, and incorporated by reference herein in its entirety.

From this point of the discussion onward, vessels 20, 120, 220 and hollow viscera will be generically referred to below as artificial lumen 45.

As with the artificial vessels, wall thickness and internal diameter of the artificial viscera 45 will vary according to what type of hollow viscera the artificial viscera 45 is mimicking. Finally, the wall thickness and internal diameter of the artificial lumen 45 also depend on the size of the animal or human being modeled and the function the lumen is supposed to perform. Also, one, two, three or four layers may be necessary depending on the function that such lumen is to perform.

Disclosed below are multilayer imitations of artificial lumens 45 built with different combinations of PCRTVS that have various distinct textures, consistencies and colors resembling with close approximation, the textures, consistencies and colors encountered in organic specimens. Like the artificial organs 10, 110, 210 disclosed above, the artificial lumens 45 mimic the feeling experienced during surgical situations in live animals or humans.

Figure 11:
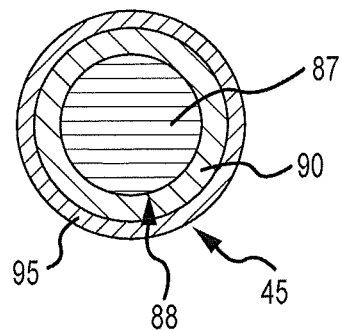
FIG. 11 is a transverse cross section of a mandrel and an artificial vessel being constructed thereon.

As can be understood from FIG. 11, which is a transverse cross section of a mandrel 87 and a multi-layer artificial lumen 45 being constructed thereon, an example method of manufacturing a multi-layer artificial lumen 45 begins by providing a cylindrical mandrel 87 with a smooth outer surface 88. The mandrel may be formed of brass, stainless steel, copper, aluminum, glass, etc. The diameter of the mandrel will depend on the desired diameter for the artificial lumen 45 being laid up on the mandrel.

A release agent is applied to the outer surface 88 of the mandrel. In one embodiment, the release agent is a 1:40 solution of a regular liquid detergent and S-L-X Denatured Alcohol. The release agent on the mandrel 87 is allowed to dry followed by covering the outer circumferential surface of the mandrel with an evenly distributed layer of an aerosolized silicone rubber, creating an innermost layer 90 of the artificial lumen 45.

The application of the aerosolized silicon rubber to the mandrel occurs with the application of heat to the outside surface of the mandrel via, for example, hot air provided by a heat gun or similar source of heated moderate air flow. The application of the aerosolized silicon rubber concomitantly with the application of a moderate flow of continuous hot air accelerates the curing process of the innermost layer 90.

As can be understood from FIG. 11, the next lumen layer 95 is then deposited about the outer circumferential surface of the innermost layer 90 via application of another aerosolized silicon rubber layer in the presence of the heated airflow. The methodology can be repeated as necessary to create artificial lumens having one, two, three, four or more layers of silicon rubber, one or more of the layers having a different Shore durometer number. Once the desired number of layers is laid up and the resulting artificial lumen is adequately cured, the mandrel can be removed from within the completed artificial lumen 45, which may then be used as an artificial vessel or artificial hollow viscera.

In one embodiment, the mandrel is constantly rotated during the depositing of the various layers about the mandrel and during the curing of such layers.

In a first embodiment of an artificial lumen 45, the inner layer 90 is formed of a PCRTVS having a Shore durometer of approximately OO10 and the outer layer is formed of a PCRTVS having a Shore durometer of approximately OO30. In other alternative embodiments, PCRTVS OO10, OO30, OO50, A10 and A20 with additives may be combined. Specifically, the artificial lumens may employ the above-listed PCRTVS materials in different mixtures and as different layers having different mixtures. Such lumens 45 may be employed as a vessel or hollow viscera. Shore durometer ranges for such lumens may be between approximately OO10 and OO50.

In a second embodiment of an artificial lumen 45, the inner layer 90 has a wall thickness of approximately 0.5 mm, the outer wall layer 95 has a wall thickness of between approximately 0.1 mm and approximately 0.2 mm, the inside diameter of the lumen 45 is approximately 1 mm, and the outside diameter of the lumen 45 is between approximately 2 mm and approximately 2.4 mm. In such an embodiment, the inner layer 90 may be formed of a material such as a super soft platinum-catalyzed silicone rubber having a Shore durometer of approximately OO30 and available from Smooth-on of Easton, Pa. under the trade name of Ecoflex OO30. In such an embodiment, the outer layer 95 may be formed of a material such as a platinum silicone rubber paint base available from Smooth-on of Easton, Pa. under the trade name of Psycho Paint. Such a lumen 45 may be employed as a vessel.

In a third embodiment of an artificial lumen 45, the inner layer 90 has a wall thickness of approximately 1 mm, the outer wall layer 95 has a wall thickness of approximately 0.5 mm, the inside diameter of the lumen 45 is approximately 2 mm, and the outside diameter of the lumen 45 is approximately 5 mm. In such an embodiment, the inner layer 90 may be formed of a material such as a super soft platinum-catalyzed silicone rubber having a Shore durometer of approximately OO30 and available from Smooth-on of Easton, Pa. under the trade name of Ecoflex OO30. In such an embodiment, the outer layer 95 may be formed of a material such as a platinum silicone rubber paint base available from Smooth-on of Easton, Pa. under the trade name of Psycho Paint. Such a lumen 45 may be employed as a vessel.

In a fourth embodiment of an artificial lumen 45, the inner layer 90 has a wall thickness of approximately 0.5 mm, the outer wall layer 95 has a wall thickness of between approximately 0.2 mm and approximately 0.3 mm, the inside diameter of the lumen 45 is approximately 1 mm, and the outside diameter of the lumen 45 is between approximately 2.4 mm and approximately 2.6 mm. In such an embodiment, the inner layer 90 may be formed of a material such as a super soft platinum-catalyzed silicone rubber having a Shore durometer of approximately OO30 and a available from Smooth-on of Easton, Pa. under the trade name of Ecoflex OO30. In such an embodiment, the outer layer 95 may be formed of a material such as a platinum silicone rubber paint base available from Smooth-on of Easton, Pa. under the trade name of Psycho Paint. Such a lumen 45 may be employed as a vessel.

In a fifth embodiment of an artificial lumen 45, the inner layer 90 has a wall thickness of approximately 3 mm, the outer wall layer 95 has a wall thickness of approximately 0.5 mm, the inside diameter of the lumen 45 is approximately 10 mm, and the outside diameter of the lumen 45 is approximately 17 mm. In such an embodiment, the inner layer 90 may be formed of a material such as a super soft platinum-catalyzed silicone rubber having a Shore durometer of approximately OO10 and available from Smooth-on of Easton, Pa. under the trade name of Ecoflex OO10. In such an embodiment, the outer layer 95 may be formed of a material such as a platinum silicone rubber having a Shore durometer of approximately OO30 and available from Smooth-on of Easton, Pa. under the trade name of Ecoflex OO30. Such a lumen 45 may be employed as a vessel.

Figure 12:
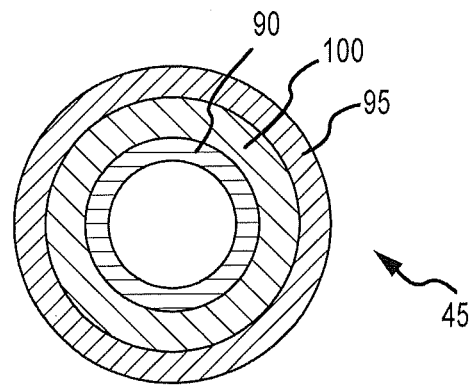
FIG. 12 is a transverse cross section of a three-layer artificial lumen.

As can be understood form FIG. 12, which is a transverse cross section of a sixth embodiment of a multi-layer artificial lumen 45, the inner layer 90 has a wall thickness of approximately 1 mm, a middle layer 100 has a wall thickness of approximately 2 mm, the outer wall layer 95 has a wall thickness of approximately 1 mm, the inside diameter of the lumen 45 is approximately 4 mm, and the outside diameter of the lumen 45 is approximately 12 mm. In such an embodiment, the middle layer 100 may be formed of a material such as a super soft platinum-catalyzed silicone rubber having a Shore durometer of approximately OO10 and available from Smooth-on of Easton, Pa. under the tradename of Ecoflex OO10. In such an embodiment, the inner layer 90 and outer layer 95 may be formed of a material such as a platinum silicone rubber paint base available from Smooth-on of Easton, Pa. under the tradename of Psycho Paint. Such a lumen 45 may be employed as a vessel.

Figure 13:
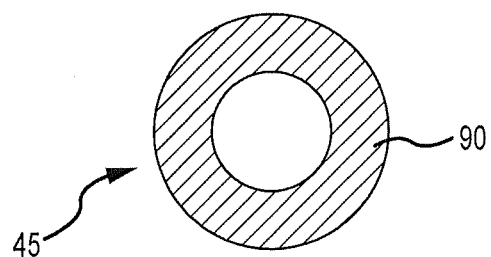
FIG. 13 is a transverse cross section of a single layer artificial lumen.

As can be understood from FIG. 13, which is a transverse cross section of a single layer artificial lumen 45, the only layer 90 of the lumen 45 has a wall thickness of approximately 1 mm, an inside diameter of the lumen 45 is approximately 2 mm, and an outside diameter of the lumen 45 is approximately 4 mm. In such an embodiment, the only layer 90 may be formed of a material such as a super soft platinum-catalyzed silicone rubber having a Shore durometer of approximately OO30 and available from Smooth-on of Easton, Pa. under the tradename of Ecoflex. Such a lumen 45 may be employed as a vessel.

Figure 14:
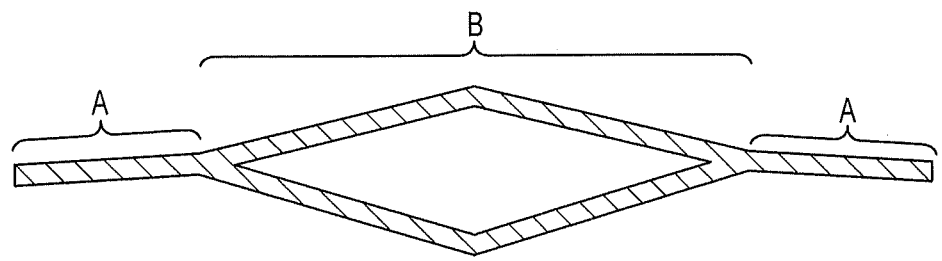
FIG. 14 is a plan view of different types of lumens joined together to form branches.

As indicated in FIG. 14, which is a plan view of different types of lumens joined together to form branches, a single artificial lumen 45 transitions into parallel artificial lumens 45 and back into a single artificial lumen 45. In one embodiment, the single artificial lumens at A in FIG. 14 are the single layer artificial lumen 45 discussed above with respect to FIG. 13. The parallel artificial lumens at B in FIG. 14 are the fourth embodiment of the multi-layer lumens 45 discussed above. Such a network of lumens 45 as depicted in FIG. 14 are advantageous for use as a network of vessels to be avoided or dealt with by the student/trainee in the event of damage during the simulated surgical approach.

The artificial lumens disclosed herein offer limited elasticity and distention, the capacity for supporting several punctures and to resist tearing when manipulated with surgical instruments and when a ligature is placed. When employed as vessels 45 in the artificial organs 10, 110, 210, the lumens 45 are not easily distinguished from surrounding tissues being cut, which brings a higher degree of fidelity to the models that are intended to bleed once an incision is performed. As vessels 45 in an artificial organ 10, 110, 210, the vessels allow the artificial organ to respond more realistic to surgical interventions by actively bleeding or oozing artificial blood or serum. The vessels 45 can be clamped and ligated.

When the lumens 45 are applied as hollow viscera 45 in a body trunk model similar to those discussed below, the lumens 45 can allow realistic anastomosis, enterotomies and removal of specific portions of the viscus as commonly performed for appendectomies in humans and small intestinal resection and anastomosis in horses and other domestic animals.

c. Laparascopic Frame and Body Torso

As mentioned above, the artificial organs 10, 110, 210 and artificial viscera 45 may be employed as part of a surgical or diagnostic simulator 300. Such a simulator 300 is configured to mimic a surgical environment where the trainee will have the opportunity to learn and/or practice target visualization, depth perception, hand coordination and instrument negotiation, tissue handling and hemostatic skills and other surgical and diagnostic skills. For example, in one embodiment, the simulator 300 is configured to allow a trainee to use a laparoscopic approach for surgical procedures such as, for example, in the context of ovary removal, etc. The simulator 300 is applicable to surgical and diagnostic training in the context of both human and animal patients.

Figure 15:
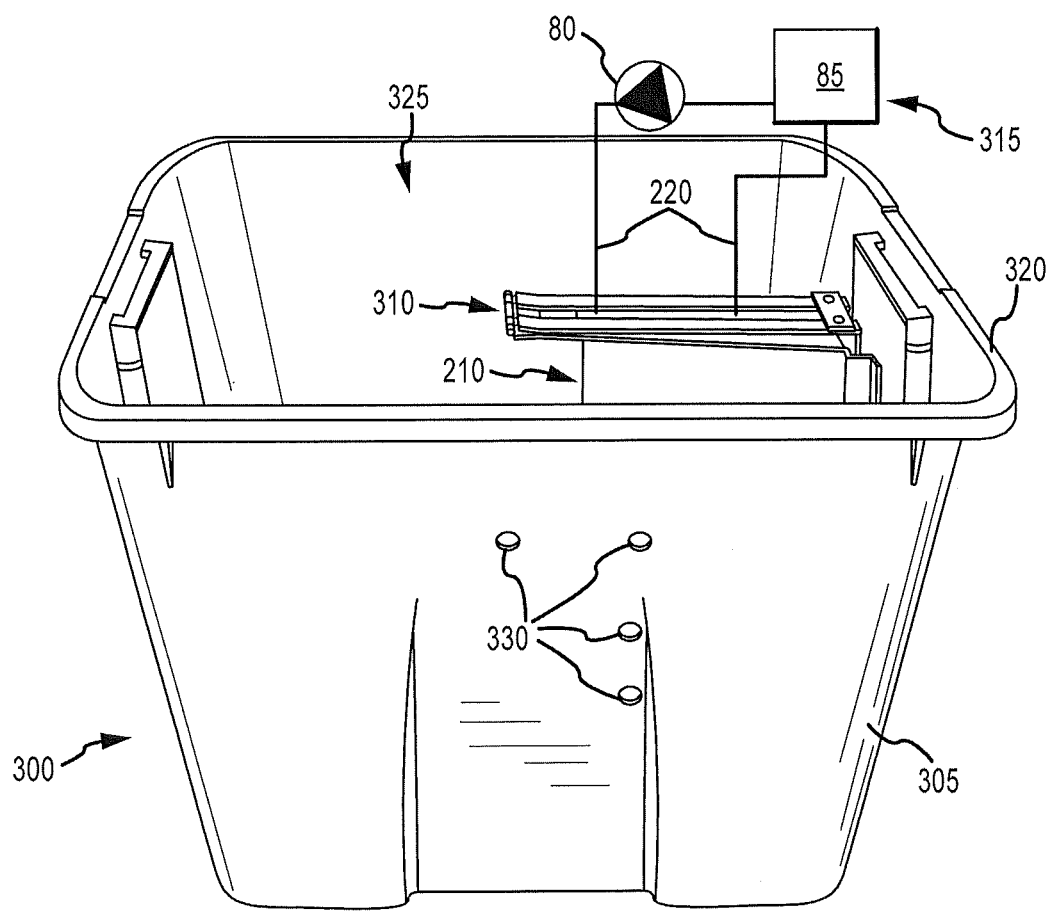
FIG. 15 is an isometric view of a simulator configured for training surgery, such as, for example, laparoscopic surgery.

For a detailed discussion of an embodiment of the simulator 300, reference is made to FIG. 15, which is an isometric view of a simulator 300 configured for training laparoscopic surgery. As shown in FIG. 15, the simulator 300 includes an enclosure 305, an organ support assembly 310, an artificial organ 210, and a fluid supply system 315. The enclosure 305 includes an exterior wall 320 that defines an interior volume 325 of the enclosure 305. The organ support assembly 310 supports the artificial organ 210, the assembly 310 and organ 210 both being located in the interior volume 325.

As can be understood from FIG. 15, in one embodiment, the enclosure 305 is simply a box-like structure, which may have an exterior wall 320 formed of a polymer, metal or etc. Surgical or diagnostic instrument openings 330 may be defined in the exterior wall 320. For example, where the simulator 300 is configured for practicing a laparoscopic surgical technique, such as, laparoscopic removal of an ovary, the instrument openings 330 may be holes that imitate laparoscopic surgical openings common to such surgeries. Specifically, the openings 330 may imitate laparoscopic surgical openings with respect to number, position, and size.

In other embodiments, the enclosure 305 is configured to replicate the appearance and construction of a human or animal torso. In such an embodiment, the exterior wall 320 may be configured to replicate the appearance and construction of a body wall, and the instrument openings 330 may have to be surgically created in the exterior wall via, for example, a trocar, scalpel, or other surgical instrument. In one embodiment, the exterior wall 320 may be in the form of an artificial body wall as disclosed in U.S. patent application Ser. No. 13/091,873, which is entitled "Simulated Tissue, Body Lumens and Body Wall and Methods of Making Same", filed Apr. 21, 2011, and incorporated by reference herein in its entirety. For example, the exterior wall 320 in the form of a body wall may have a multi-layer arrangement wherein an epidermis-dermis layer extends over a muscle belly layer having a fascia capsule enclosing a muscle layer. Each of these body wall layers, as well as other body wall layers such as, for example, a subcutaneous layer, and a peritoneum or pleura layer, may be formed of different types and mixtures of PCRVTS and have different textures and durometers. These layers of the body wall may be laid up in a layer-by-layer fashion. Further the different layers of the artificial body wall, such as, for example, the subcutaneous layer and/or muscle layer, may be vascularized with the artificial vessels 45 described above. Specifically, the vessels 45 may be imbedded in the subcutaneous layer and/or muscle layer. The vessels 45 can then be coupled to a fluid supply system 315 such that the vessels bleed when nicked or severed during a surgical procedure involving the artificial body wall. Thus, where the enclosure 305 has an exterior wall 320 in the form of an artificial body wall, in trying to gain surgical access to the artificial organ 210 located in the interior volume 325, the trainee can surgically create instrument openings 330 in the artificial body wall via a trocar, scalpel, etc. Where the artificial body wall is configured to bleed when cut or penetrated, the trainee will have to address bleeding of the artificial body wall like an actual surgical procedure.

Figure 16:
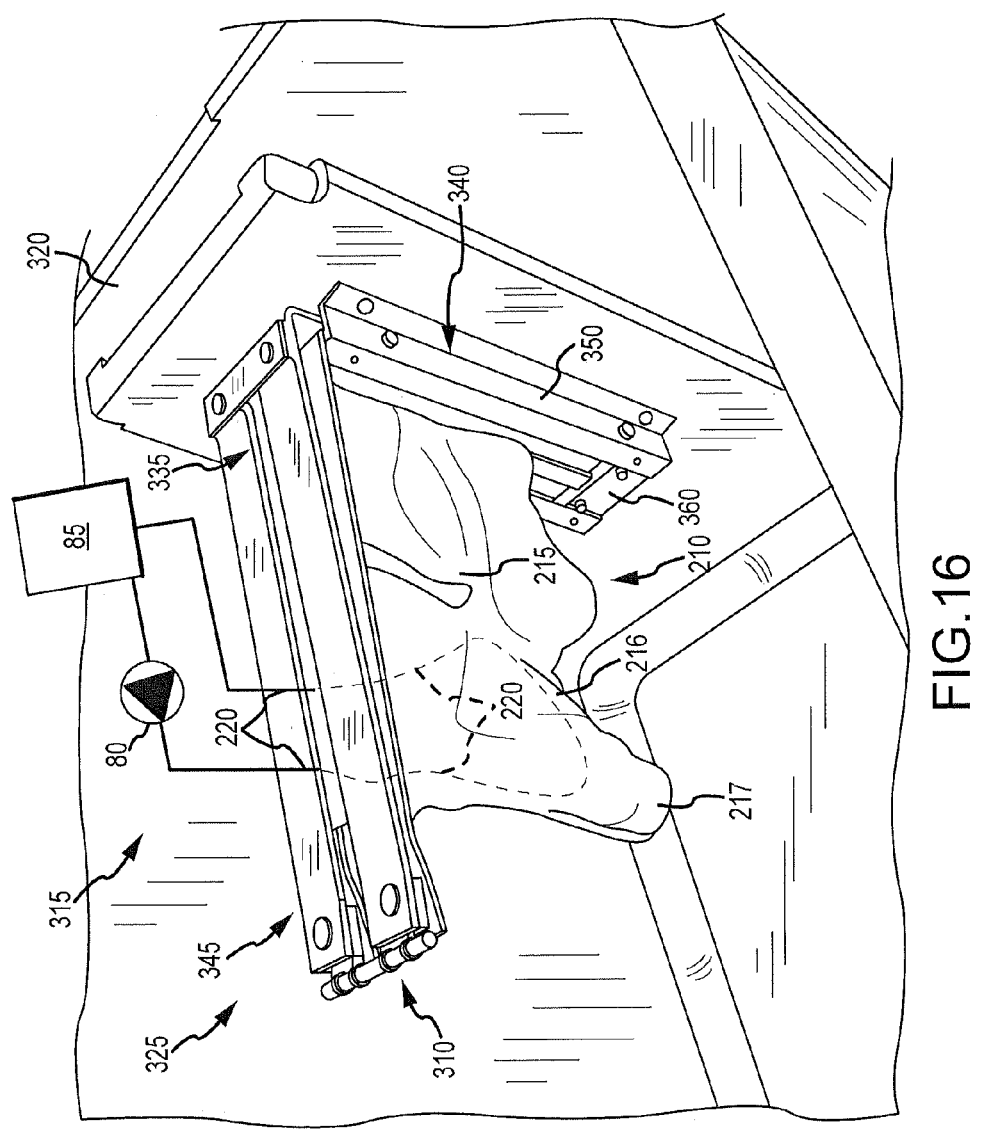
FIG. 16 is an isometric view of the interior volume of the simulator enclosure.

As illustrated in FIG. 16, which is an isometric view of the interior volume 325 of the simulator enclosure 305, the organ support assembly 310 is supported in the interior volume 325 via, for example, being secured to the interior of the exterior wall 320. The artificial organ 210, which is shown in FIG. 16 as an artificial ovarian organ 210, but may be any other type of artificial organ, is supported off of the organ support assembly 310 in a removable fashion as will become evident from the following discussion.

As indicated in FIG. 16, the artificial vessels 220 of the artificial organ 210 are fluidly coupled to a fluid supply system 315, which may have an elevated fluid reservoir 85 or both a fluid reservoir 85 and a pump 80. Where a pump 80 is provided, the pump 80 pressurizes the fluid system such that a fluid, for example, an artificial blood, is causes to flow through the vessels 45 of the artificial organ 210 and, if present, the artificial body wall forming the exterior wall 320 of the simulator enclosure 305. Thus, when vessels 45 within the artificial organ 210 and artificial body wall (if present) are cut in the course of practicing a medical procedure via the simulator, the artificial blood will be caused to flow from the cuts, resulting in a more realistic learning experience. Where no pump is provided, the reservoir will be elevated sufficiently to provide the head needed to pressurize the fluid system.

The fluid system may include an element that facilitates determining an amount of fluid lost via an opening created in an artificial organ or the vessels 45 in an artificial organ or artificial body wall. For example, if one or more vessels 45 are cut during a simulated surgical technique practiced with the simulator 300 wall, a float in a liquid reservoir, a fluid flow meter, or other devices may be used to determine how much fluid has escaped from the cut vessels 45 prior to the cut vessels being sutured closed. Thus, a student practicing a medical technique via the simulator 300 can be evaluated with respect to whether the student allowed too much liquid (e.g., artificial blood) to be lost from the patient during the medical technique.

In one embodiment as depicted in FIG. 16, the organ support assembly 310 includes a horizontal portion 335 and a vertical portion 340. The horizontal portion 335 supports the artificial organ 210 via a support structure 245 molded or otherwise formed in the artificial organ 210. The artificial organ 210 may hang from the horizontal portion 335 of the organ support assembly 310. The artificial organ 210 may be any type of artificial organ, including, as depicted in FIG. 16, an artificial ovarian organ 210 with its body 215, ovary 216, uterine horn 217, vessel 220 and support structure 245 as discussed above.

Figure 17:
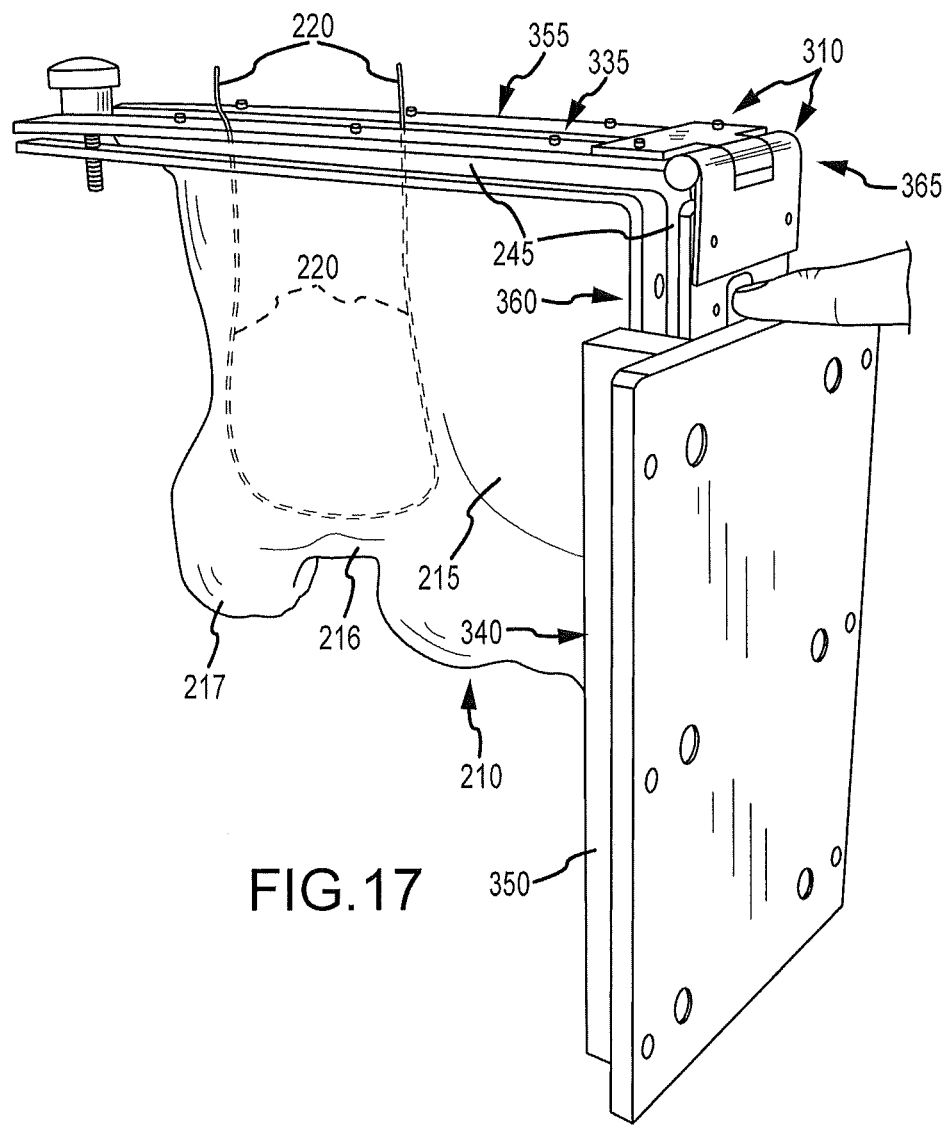
FIG. 17 is an isometric view of the organ support assembly and artificial organ removed from the simulator enclosure.

As illustrated in FIG. 17, which is an isometric view of the organ support assembly 310 and artificial organ 210 removed from the simulator enclosure 305, the artificial organ 210 can be seen to hang from the horizontal portion 335 of the support assembly 310. The organ support assembly 310 includes a clamp assembly 345 and a flanged plate 350. As can be understood from FIGS. 16 and 17 and more clearly depicted in FIG. 18, which is a side view of the organ support assembly 310 disassembled, the clamp assembly 345 forms a generally right angle configuration. Specifically, the clamp assembly 345 includes a horizontal clamp portion 355 and a vertical clamp portion 360 intersecting at a corner 365 and forming a right angle relative to each other.

Figure 18:
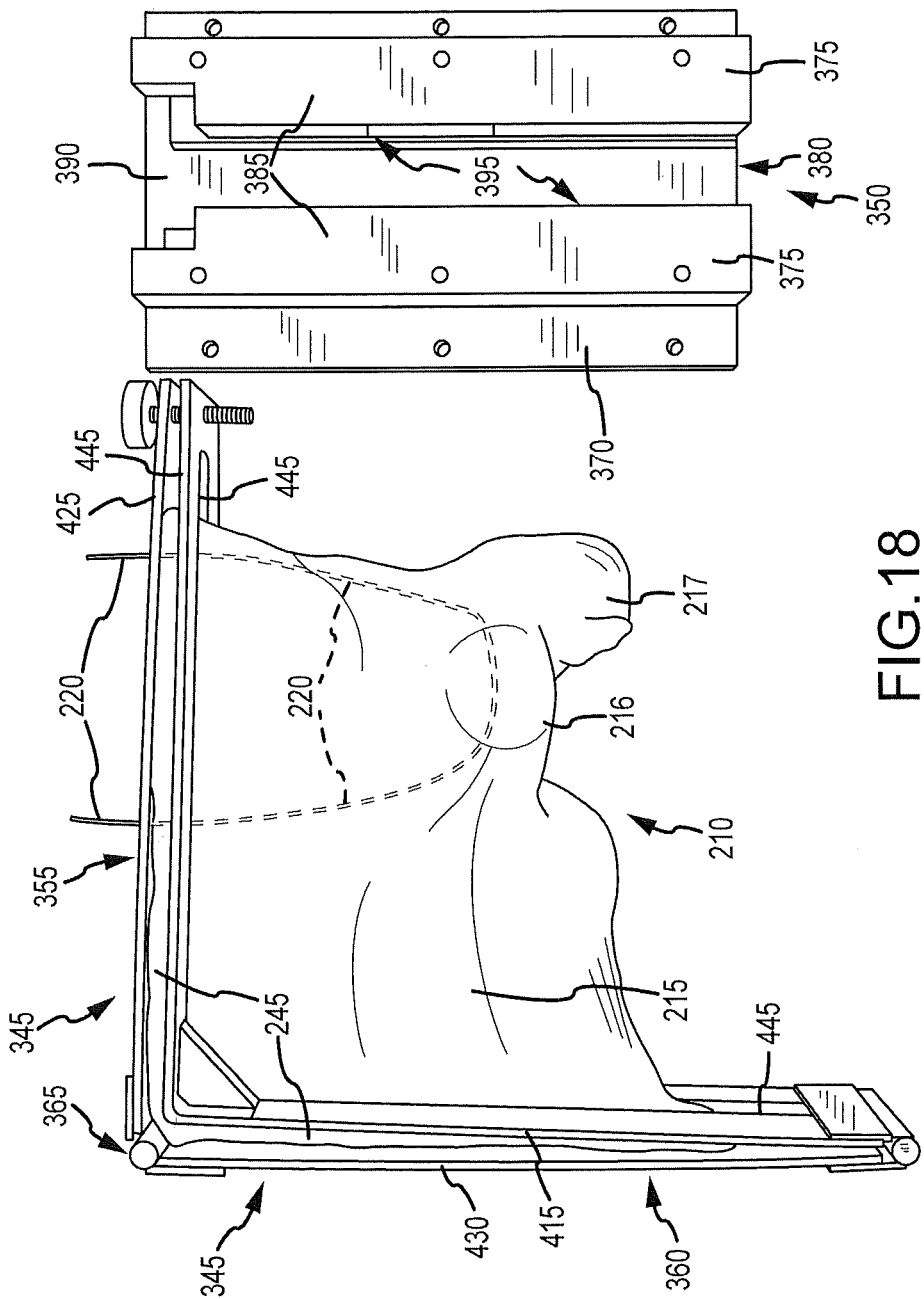
FIG. 18 is a side view of the organ support assembly disassembled.

As indicated in FIG. 18, the flanged plate 350 includes a base plate 370 and first and second opposed flanges 375 that extend vertically along the base plate 370 and are spaced apart from each other to define a vertical slot 380. Front face portions 385 of each flange 375 are spaced apart from a front face 390 of the base plate 370, thereby defining slots or grooves 395 that also extend vertically. The grooves 395 taper wide to narrow moving from the top of the grooves 395 to the bottom of the grooves 395.

As can be understood from FIGS. 16 and 17, the vertical clamp portion 360 of the clamp assembly 345 is received in the grooves 395 of the flanged plate 350 such that a lower portion of the artificial organ 210 extending from the vertical clamp portion 360 extends from the slot 380 of the flanged plate 350. The tapered arrangement of the grooves 395 creates an interference fit with vertical clamp portion 360 received therein. The base plate 370 is secured to the exterior wall 320 of the simulator enclosure 305.

In one embodiment, the clamp assembly 345 and flange plate 350 are formed of a metal, such as, for example, stainless steel, aluminum, etc. In other embodiments, the clamp assembly 345 and flange plate 350 are formed of a polymer or composite material.

Figure 19:
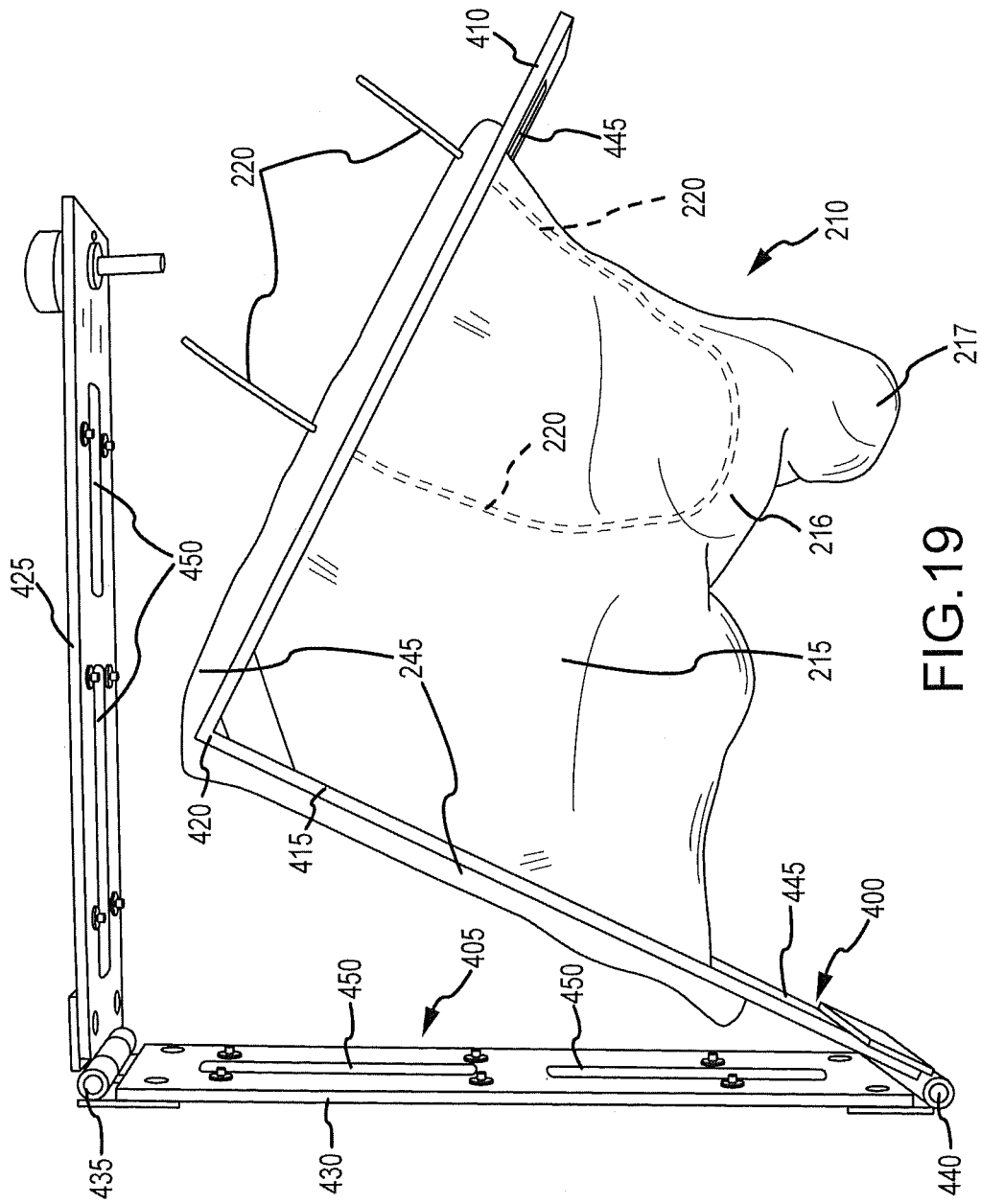
FIG. 19 is the same view of the clamp assembly as FIG. 18, except in a non-nested configuration and without the flange plate.

As illustrated in FIG. 19, which is the same view of the clamp assembly 345 as FIG. 18, except in a non-nested configuration and without the flange plate, the clamp assembly 345 includes an inner right angle assembly 400 and an outer right angle assembly 405. The inner right angle assembly 400 includes a horizontal member 410 and a vertical member 415 joined together in a generally right angle configuration at a reinforced fixed corner 420. The outer right angle assembly 405 includes a horizontal member 425 and a vertical member 430 joined together in a generally right angle configuration at a hinged corner 435. The respective bottom ends of the vertical members 415, 430 of the two right angle assemblies 400, 405 are pivotally coupled together via a hinge 440.

As depicted in FIGS. 18 and 19, each of the horizontal and vertical members 410, 415 of the inner right angle assembly 400 include slots 445 extending lengthwise along the plates forming the members 410, 415. Similar slots 450 may be defined in the plates forming the members 425, 430 of the outer right angle assembly 400.

Figure 20:
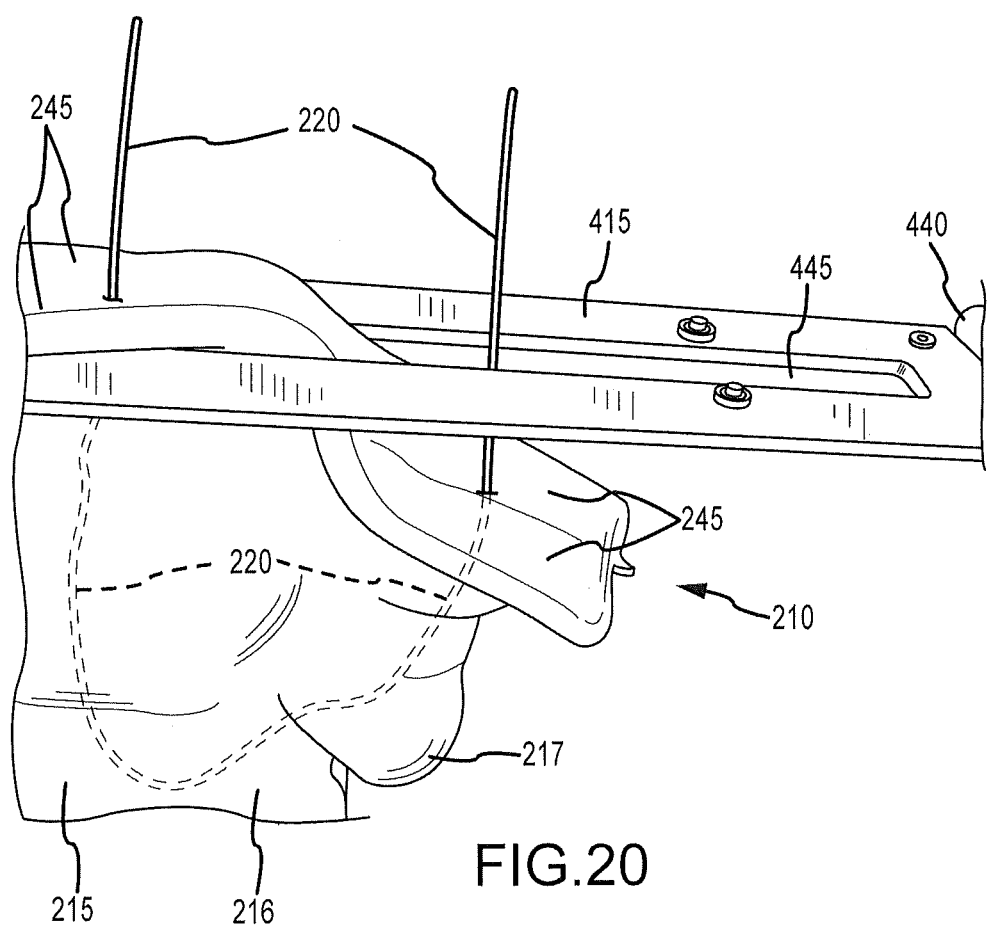
FIG. 20 is an enlarged isometric view of a portion of the vertical member of the inner right angle assembly near the hinge.

As illustrated in FIG. 20, which is an enlarged isometric view of a portion of the vertical member 415 of the inner right angle assembly 400 near the hinge 440, the support structure 245 molded or otherwise formed into the artificial organ 210 is inserted through the slot 445 of the vertical member 415 of the inner right angle assembly 400. Since the support structure 245 has a transverse cross section in the form of a T-flange, the support structure 245 overlaps across the face of the plate forming the vertical member 415 when the support structure 245 is completely through the slot 445, as depicted in FIG. 19 and as in progress in FIG. 20. Accordingly, the artificial organ 210 is supported off of the plates forming the horizontal and vertical members 410, 415 of the inner right angle assembly 400.

As shown in FIG. 18, when the inner right angle assembly 400 is nested in the outer right angle assembly 405, the support structure 245 is sandwiched and clamped between the plate faces of the respective opposed vertical members 415, 430 and horizontal members 410, 425 of the inner and outer right angle assemblies. A threaded member 450 with a knob handle 455 at one end extends between the two horizontal members 410, 425 to clamp together the members of the inner and outer right angle assemblies 400, 405, thereby securing the artificial organ to the organ support assembly 310 as illustrated in FIG. 16.

As can be understood from FIGS. 15, 16 and 20, the vessel 220 extends through the slots 445 of the clamp assembly 345 to be fluidly coupled to the fluid supply system 315. Thus, the clamp assembly 345 maintains the artificial organ 210 in a correct position within the simulator enclosure 305 and still allows for passage of artificial blood within the vessels 220. The flanged plate 350 with its tapered slots receives the clamp assembly 345 and locks it into position within the simulator enclosure 305. The clamp assembly 345 has a generally L-shaped configuration when locked into the flanged plate 350.

In one embodiment, the simulator enclosure 305 and organ support assembly 310 are reusable such that the artificial organ only need be replaced and couple to the fluid system for each simulated surgery. In a version of such an embodiment, the exterior wall of the simulator enclosure 305 can be configured such that a portion of the exterior wall has permanent fixed surgical openings 330.

Alternatively, a portion of the exterior wall can have an artificial body wall formed of PCRTVS. Surgical openings can be created in the artificial body wall via a trocar or scalpel in the process of performing a simulated surgery. The artificial body wall then being replaced with a new artificial body wall when the rest of the simulator 300 is reused for another simulated surgery.

In one embodiment, the simulator enclosure may be configured to resemble a patient torso, the patient torso having an artificial body wall formed of PCRTVS and enclosing one or more artificial organs formed of PCRTVS and/or one or more artificial viscera formed of PCRTVS. Once the simulated surgery is performed on the simulator 300 by creating surgical access openings in the artificial body wall and performing surgical procedures on the artificial organs and/or artificial viscera, the simulator can be discarded.

Although the present invention has been described with reference to preferred embodiments, persons skilled in the art will recognize that changes may be made in form and detail without departing from the spirit and scope of the invention.

What is claimed is:

1. A surgical simulator comprising:
an artificial organ substantially formed of platinum cured room temperature vulcanization silicone rubber ("PCRTVS"); and
an enclosure substantially enclosing the artificial organ, wherein the artificial organ comprises at least one lumen substantially formed of PCRTVS.

2. The surgical simulator of claim 1, wherein the at least one lumen generally imitates a vascular inflow and outflow tract segmented according to Couinaud's classification.

3. The surgical simulator of claim 1, wherein the artificial organ comprises an artificial liver, and the at least one lumen generally imitates a biliary drainage tract segmented according to Couinaud's classification.

4. The surgical simulator of claim 1, further comprising fluid pressurizing means configured to fluidly pressurizing the at least one lumen.

5. The surgical simulator of claim 4, wherein, the fluid pressurizing means comprises at least one of a pumping mechanism or a fluid reservoir.

6. The surgical simulator of claim 4, further comprising an element that facilitates determining an amount of fluid lost via an opening created in the at least one lumen.

7. A surgical simulator comprising:
an artificial organ substantially formed of platinum cured room temperature vulcanization silicone rubber ("PCRTVS"); and
an enclosure substantially enclosing the artificial organ, wherein the artificial organ is substantially formed of a mixture comprising a ground cured PCRTVS mixed with a liquid PCRTVS that is then allowed to cure.

8. The surgical simulator of claim 7, wherein the ground cured PCRTVS includes at least one of a ground cured PCRTVS durometer Shore A10, a ground cured PCRTVS durometer Shore OO3, or a ground cured PCRTVS durometer Shore OO10.

9. The surgical simulator of claim 8, wherein the liquid PCRTVS comprises a PCRTVS durometer Shore OO30.

10. The surgical simulator as in any of claim 1 or 7, in which the artificial organ comprises an artificial ovarian organ.

11. The surgical simulator of claim 10, wherein the artificial ovarian organ comprises an ovary portion formed of one type of PCRTVS and a uterine horn portion formed of another type of PCRTVS.

12. The surgical simulator of claim 11, wherein the ovarian portion is substantially formed of PCRTVS durometer Shore A10, and the uterine horn portion is substantially formed of PCRTVS durometer Shore OO10.

13. The surgical simulator of claim as in any of claim 1 or 7, wherein the artificial organ comprises a first portion formed of one type of PCRTVS and a second portion formed of another type of PCRTVS.

14. The surgical simulator of claim 13, wherein the first portion is substantially formed of PCRTVS durometer Shore A10, and the second portion is substantially formed of PCRTVS durometer Shore OO10.

15. The surgical simulator as in any of claim 1 or 7, in which the artificial organ comprises an artificial liver organ.

16. The surgical simulator as in any of claim 1 or 7, in which the artificial organ comprises an artificial spleen organ.

17. The surgical simulator as in any of claim 1 or 7, in which the enclosure comprises an exterior wall including surgical access openings defined therein.

18. The surgical simulator of claim 17, wherein the surgical access openings are configured for laparoscopic surgical instruments.

19. The surgical simulator of claim 17, further comprising an organ support assembly configured to removably support the artificial organ within the enclosure.

20. The surgical simulator of claim 17, wherein the exterior wall comprises an artificial body wall substantially formed of different layers of PCRTVS.

21. The surgical simulator of claim 20, wherein the artificial body wall is vascularized with a plurality of lumens substantially formed of PCRTVS.

22. The surgical simulator of claim 21, further comprising pressurizing means configured to fluidly pressurizing the plurality of lumens that vascularize the artificial body wall, the pressurizing means comprising at least one of a pumping mechanism or a fluid reservoir.

23. The surgical simulator of claim 22, further comprising an element that facilitates determining an amount of fluid lost via an opening created in the plurality of lumens that vascularize the artificial body wall.

* * * * *